(12) United States Patent
Suginishi et al.

(10) Patent No.: US 11,823,111 B2
(45) Date of Patent: Nov. 21, 2023

(54) WORK INSTRUCTION SYSTEM AND WORK INSTRUCTION METHOD

(71) Applicant: Hitachi, Ltd., Tokyo (JP)

(72) Inventors: Yuuichi Suginishi, Tokyo (JP); Toru Tanaka, Tokyo (JP); Shinichi Kawamoto, Tokyo (JP); Katsuhiko Tsunehara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 5 days.

(21) Appl. No.: 17/101,122

(22) Filed: Nov. 23, 2020

(65) Prior Publication Data
US 2021/0182762 A1    Jun. 17, 2021

(30) Foreign Application Priority Data

Dec. 12, 2019  (JP) .................... 2019-224216

(51) Int. Cl.
*G06Q 10/0639*    (2023.01)
*G06Q 10/0633*    (2023.01)
*G05B 19/418*    (2006.01)

(52) U.S. Cl.
CPC .  *G06Q 10/06393* (2013.01); *G05B 19/41865* (2013.01); *G05B 19/41885* (2013.01); *G06Q 10/0633* (2013.01); *G06Q 10/06398* (2013.01)

(58) Field of Classification Search
CPC ........ G05B 19/41865; G05B 19/41885; G06Q 10/00
See application file for complete search history.

(56) References Cited

U.S. PATENT DOCUMENTS

| 2006/0212323 | A1* | 9/2006 | Ninomiya | ........ G06Q 10/06314 705/7.29 |
| 2012/0158167 | A1* | 6/2012 | Lengyel | ................. G06Q 50/04 700/101 |
| 2015/0268994 | A1* | 9/2015 | Okabayashi | .......... G06F 9/4843 718/103 |

FOREIGN PATENT DOCUMENTS

| JP | 5-101999 A | 4/1993 |
| JP | 2009-110108 A | 5/2009 |
| JP | 2018-180588 A | 11/2018 |

OTHER PUBLICATIONS

Japanese Office Action received in corresponding Japanese Application No. 2019-224216 dated Mar. 14, 2023.

* cited by examiner

*Primary Examiner* — Rutao Wu
*Assistant Examiner* — Zahra Elkassabgi
(74) *Attorney, Agent, or Firm* — MATTINGLY & MALUR, PC

(57) ABSTRACT

A work instruction system includes: a production progress management device including a communication unit configured to communicate with a work instruction device, a product signal storage unit that stores a product signal including position information of a product, a product in-progress process estimation unit configured to estimate an in-progress process of the product using the position information, and a production progress estimation and update unit configured to estimate production progress of the product in accordance with a change in the position information and update production progress information; and the work instruction device including a communication unit configured to communicate with the production progress management device, a production progress storage unit that stores the production progress information, a data collection unit (Continued)

configured to obtain progress management information updated from the production progress management device, a recommended work generation unit configured to generate recommended work information, and an output unit.

8 Claims, 24 Drawing Sheets

[FIG. 1]
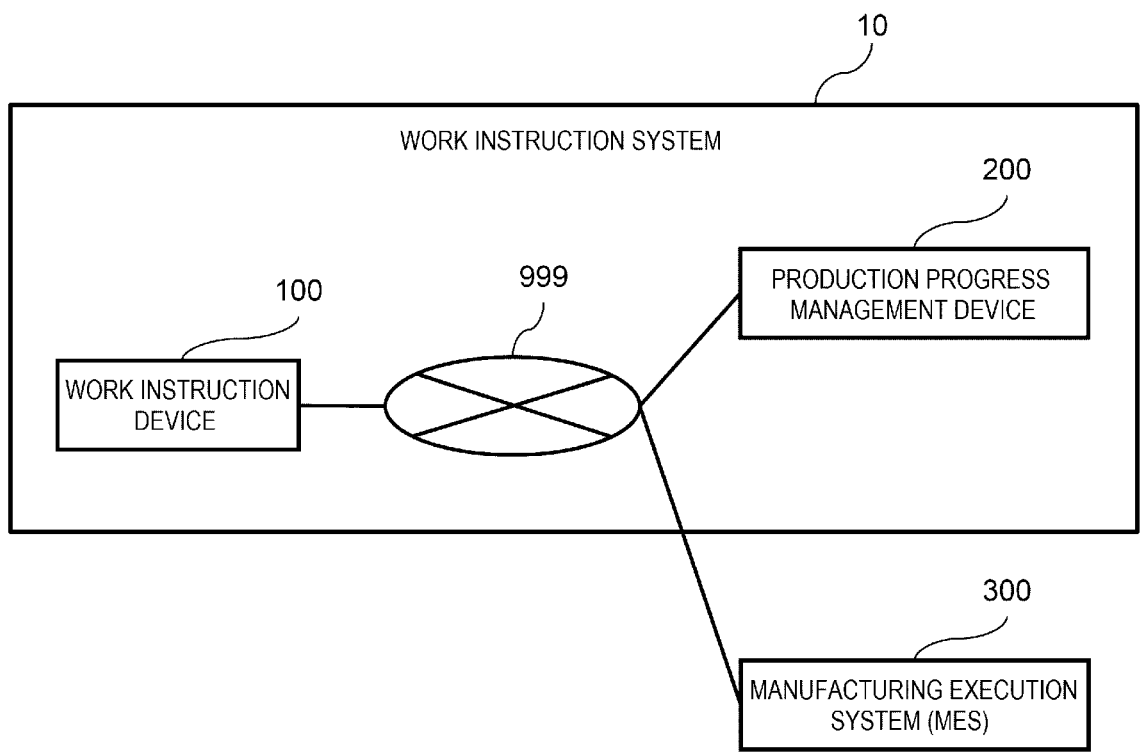

[FIG. 2]
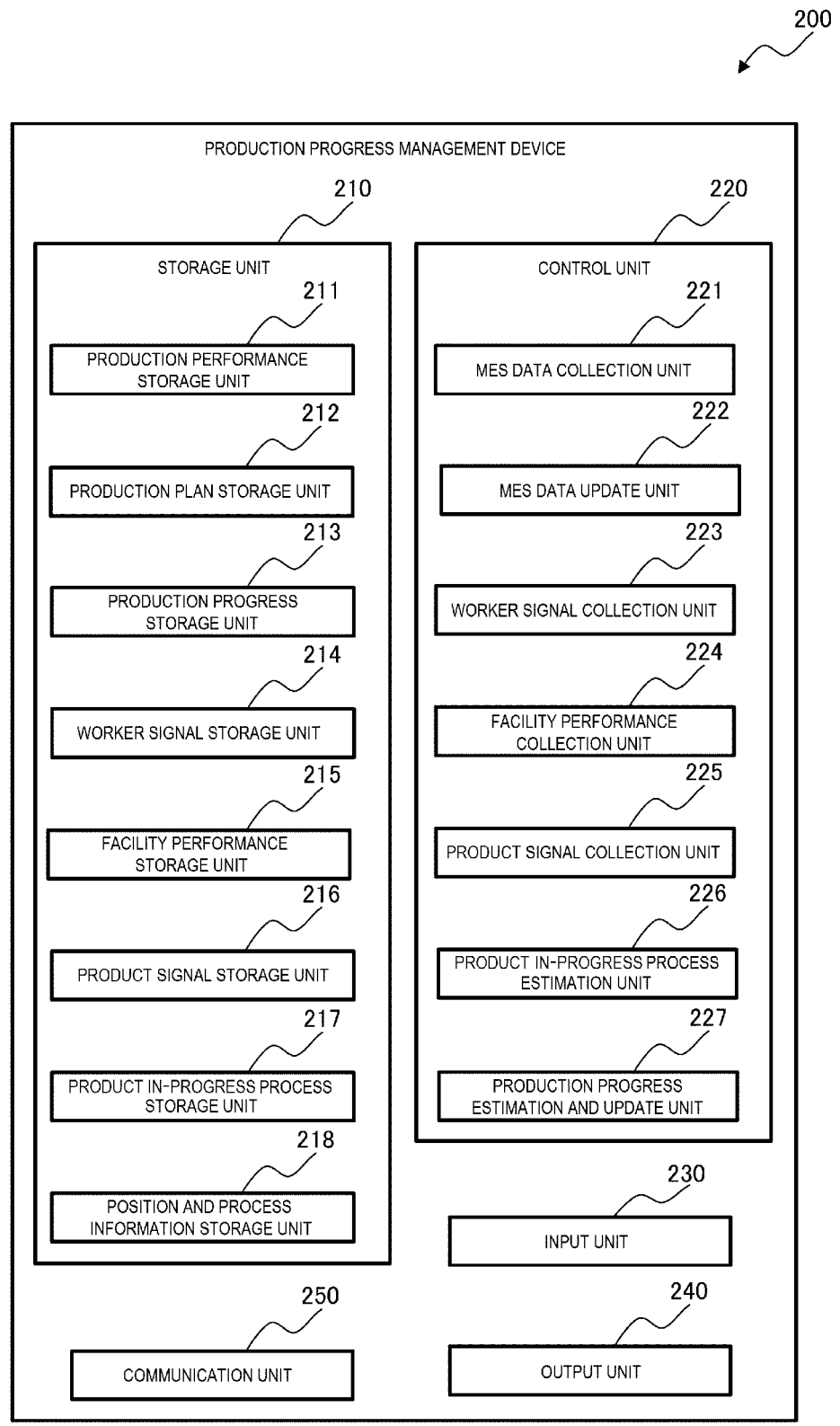

[FIG. 3]
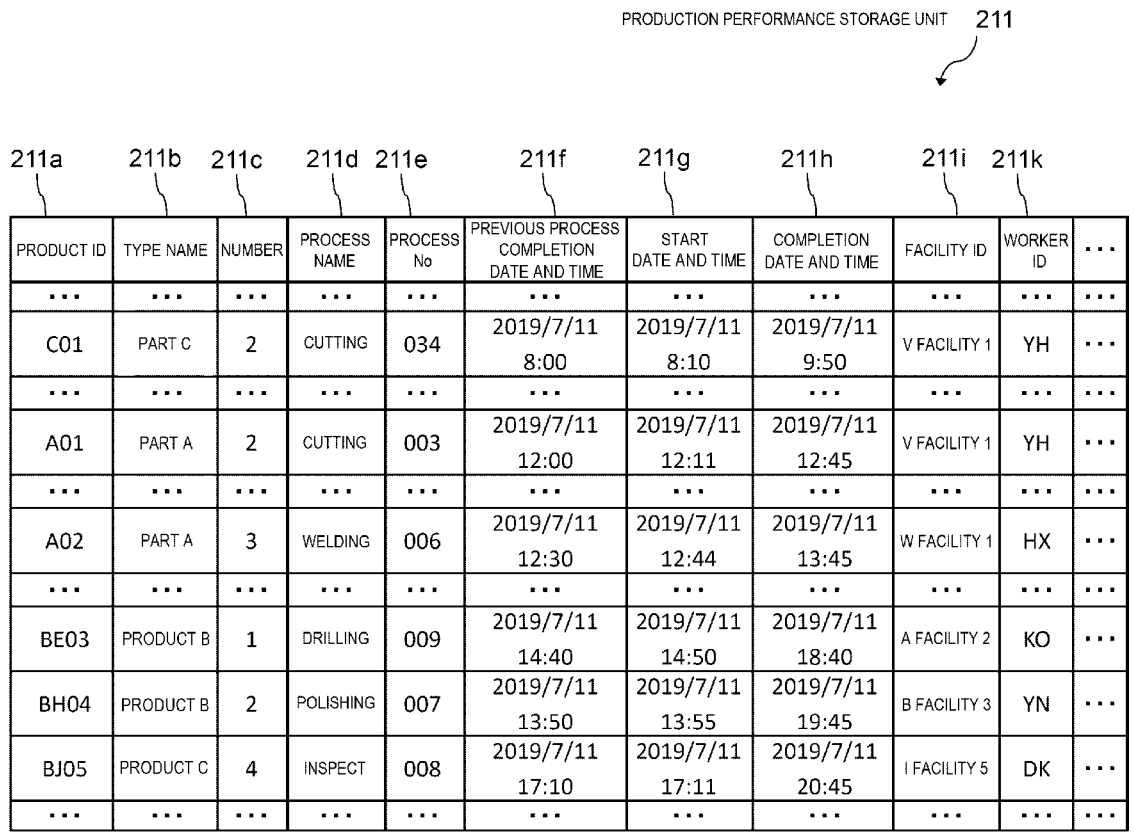

[FIG. 4]

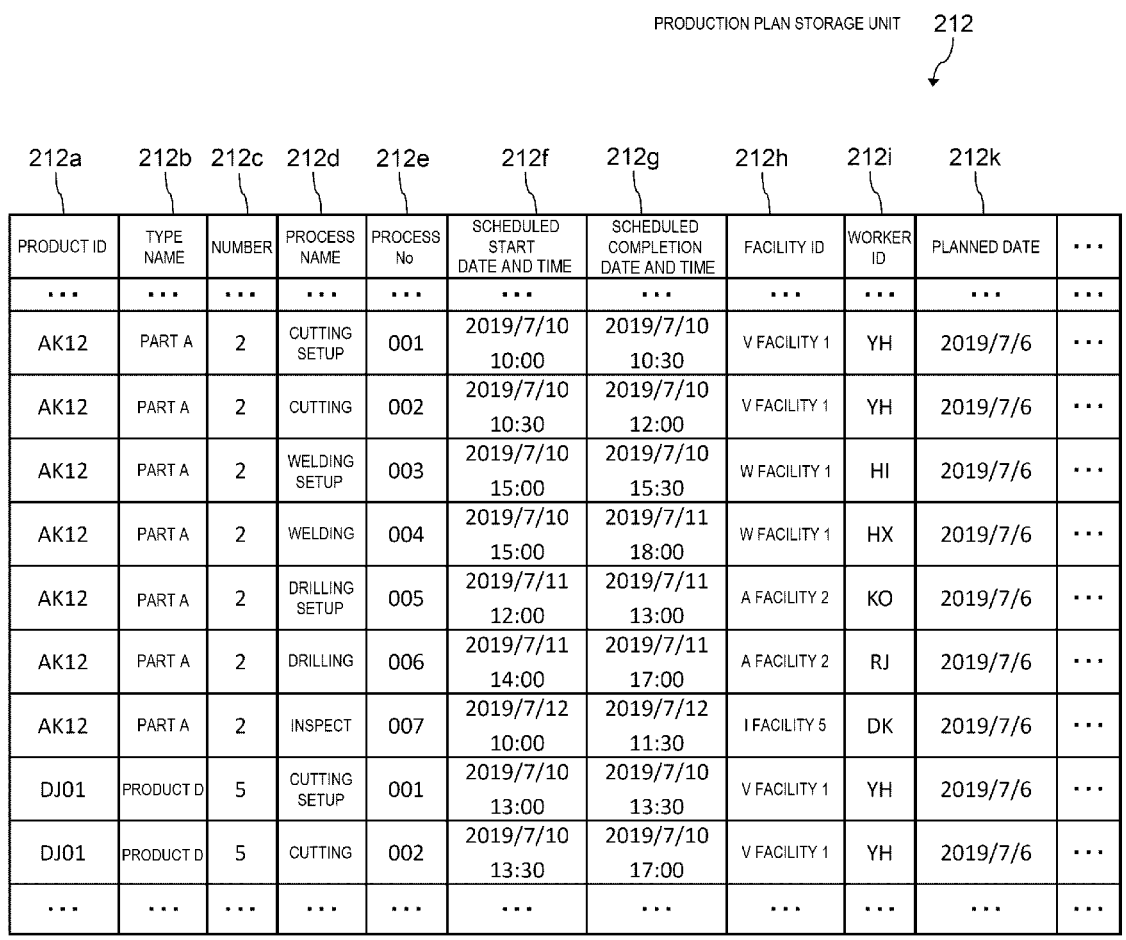

PRODUCTION PLAN STORAGE UNIT 212

| PRODUCT ID | TYPE NAME | NUMBER | PROCESS NAME | PROCESS No | SCHEDULED START DATE AND TIME | SCHEDULED COMPLETION DATE AND TIME | FACILITY ID | WORKER ID | PLANNED DATE | ... |
|---|---|---|---|---|---|---|---|---|---|---|
| 212a | 212b | 212c | 212d | 212e | 212f | 212g | 212h | 212i | 212k | |
| ... | ... | ... | ... | ... | ... | ... | ... | ... | ... | ... |
| AK12 | PART A | 2 | CUTTING SETUP | 001 | 2019/7/10 10:00 | 2019/7/10 10:30 | V FACILITY 1 | YH | 2019/7/6 | ... |
| AK12 | PART A | 2 | CUTTING | 002 | 2019/7/10 10:30 | 2019/7/10 12:00 | V FACILITY 1 | YH | 2019/7/6 | ... |
| AK12 | PART A | 2 | WELDING SETUP | 003 | 2019/7/10 15:00 | 2019/7/10 15:30 | W FACILITY 1 | HI | 2019/7/6 | ... |
| AK12 | PART A | 2 | WELDING | 004 | 2019/7/10 15:00 | 2019/7/11 18:00 | W FACILITY 1 | HX | 2019/7/6 | ... |
| AK12 | PART A | 2 | DRILLING SETUP | 005 | 2019/7/11 12:00 | 2019/7/11 13:00 | A FACILITY 2 | KO | 2019/7/6 | ... |
| AK12 | PART A | 2 | DRILLING | 006 | 2019/7/11 14:00 | 2019/7/11 17:00 | A FACILITY 2 | RJ | 2019/7/6 | ... |
| AK12 | PART A | 2 | INSPECT | 007 | 2019/7/12 10:00 | 2019/7/12 11:30 | I FACILITY 5 | DK | 2019/7/6 | ... |
| DJ01 | PRODUCT D | 5 | CUTTING SETUP | 001 | 2019/7/10 13:00 | 2019/7/10 13:30 | V FACILITY 1 | YH | 2019/7/6 | ... |
| DJ01 | PRODUCT D | 5 | CUTTING | 002 | 2019/7/10 13:30 | 2019/7/10 17:00 | V FACILITY 1 | YH | 2019/7/6 | ... |
| ... | ... | ... | ... | ... | ... | ... | ... | ... | ... | ... |

[FIG. 5]
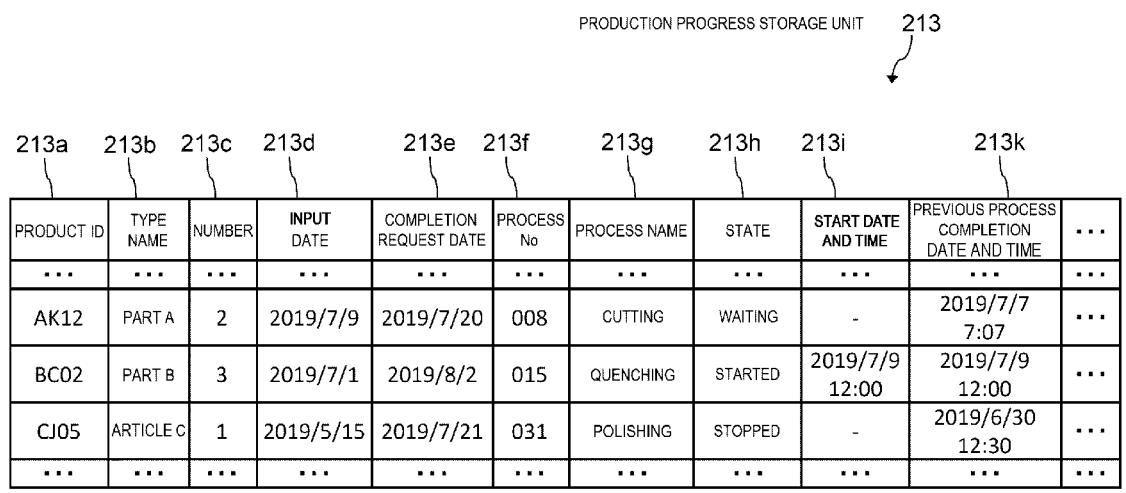
PRODUCTION PROGRESS STORAGE UNIT 213
| PRODUCT ID | TYPE NAME | NUMBER | INPUT DATE | COMPLETION REQUEST DATE | PROCESS No | PROCESS NAME | STATE | START DATE AND TIME | PREVIOUS PROCESS COMPLETION DATE AND TIME | ... |
|---|---|---|---|---|---|---|---|---|---|---|
| ... | ... | ... | ... | ... | ... | ... | ... | ... | ... | ... |
| AK12 | PART A | 2 | 2019/7/9 | 2019/7/20 | 008 | CUTTING | WAITING | - | 2019/7/7 7:07 | ... |
| BC02 | PART B | 3 | 2019/7/1 | 2019/8/2 | 015 | QUENCHING | STARTED | 2019/7/9 12:00 | 2019/7/9 12:00 | ... |
| CJ05 | ARTICLE C | 1 | 2019/5/15 | 2019/7/21 | 031 | POLISHING | STOPPED | - | 2019/6/30 12:30 | ... |
| ... | ... | ... | ... | ... | ... | ... | ... | ... | ... | ... |

[FIG. 6]
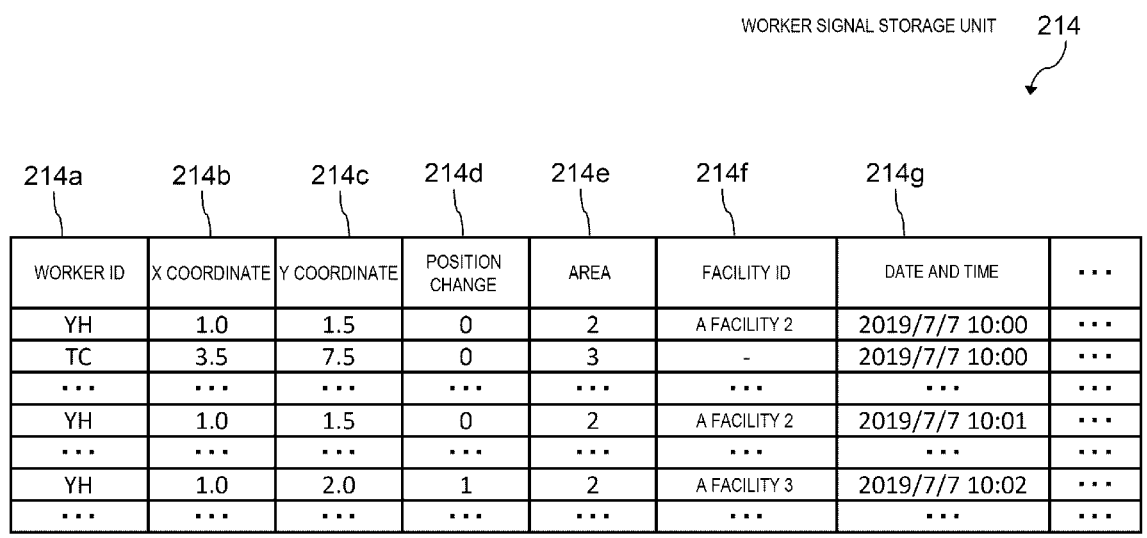

[FIG. 7]
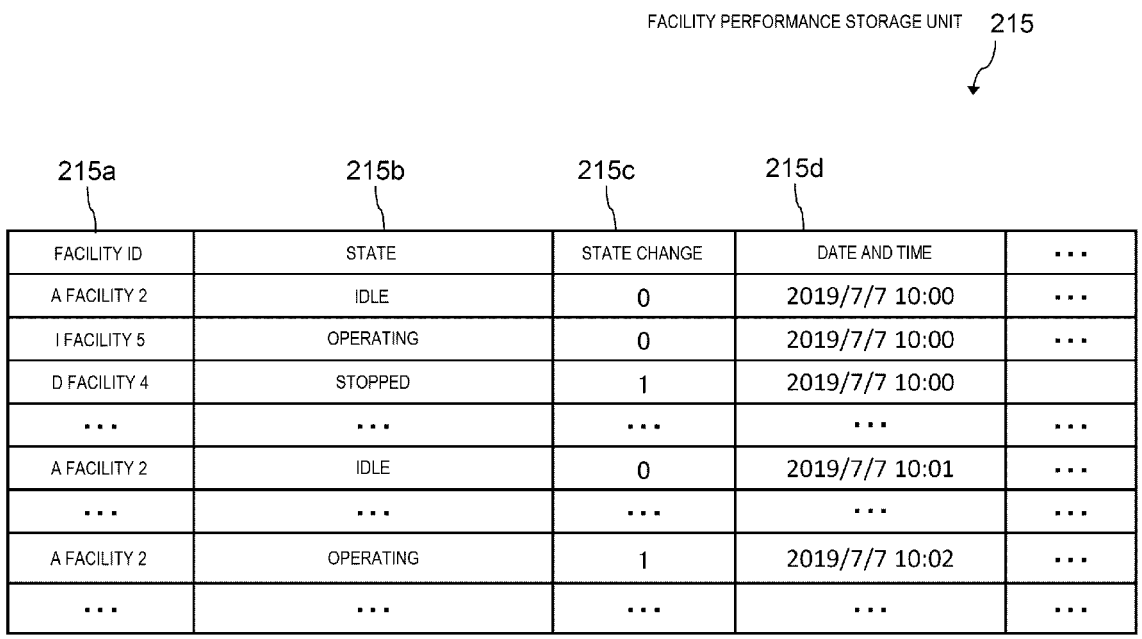
FACILITY PERFORMANCE STORAGE UNIT 215
| FACILITY ID | STATE | STATE CHANGE | DATE AND TIME | ... |
|---|---|---|---|---|
| A FACILITY 2 | IDLE | 0 | 2019/7/7 10:00 | ... |
| I FACILITY 5 | OPERATING | 0 | 2019/7/7 10:00 | ... |
| D FACILITY 4 | STOPPED | 1 | 2019/7/7 10:00 | |
| ... | ... | ... | ... | ... |
| A FACILITY 2 | IDLE | 0 | 2019/7/7 10:01 | ... |
| ... | ... | ... | ... | ... |
| A FACILITY 2 | OPERATING | 1 | 2019/7/7 10:02 | ... |
| ... | ... | ... | ... | ... |
215a  215b  215c  215d

[FIG. 8]
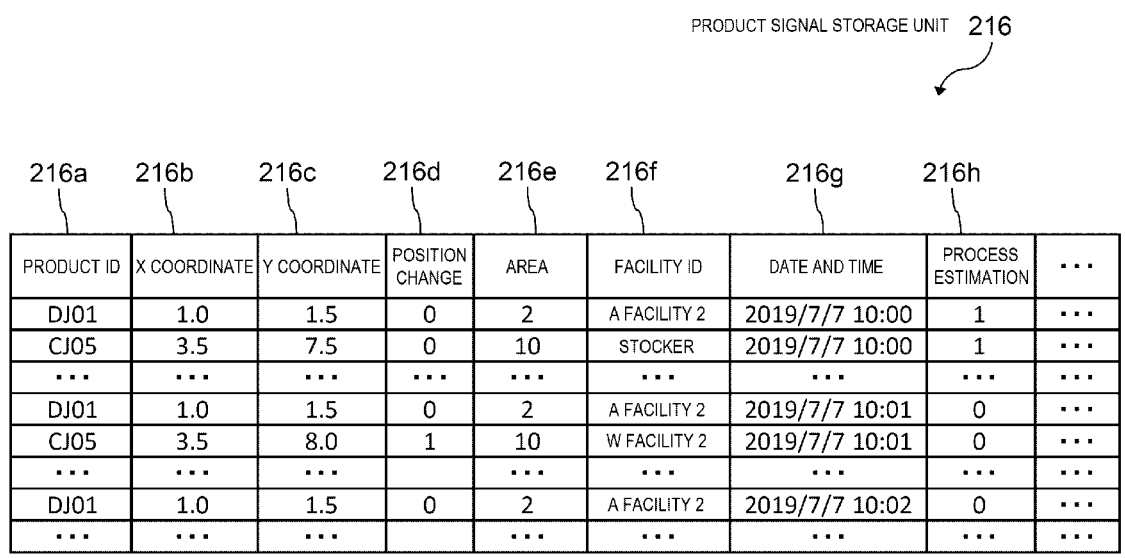
PRODUCT SIGNAL STORAGE UNIT 216
| PRODUCT ID | X COORDINATE | Y COORDINATE | POSITION CHANGE | AREA | FACILITY ID | DATE AND TIME | PROCESS ESTIMATION | ... |
|---|---|---|---|---|---|---|---|---|
| DJ01 | 1.0 | 1.5 | 0 | 2 | A FACILITY 2 | 2019/7/7 10:00 | 1 | ... |
| CJ05 | 3.5 | 7.5 | 0 | 10 | STOCKER | 2019/7/7 10:00 | 1 | ... |
| ... | ... | ... | ... | ... | ... | ... | ... | ... |
| DJ01 | 1.0 | 1.5 | 0 | 2 | A FACILITY 2 | 2019/7/7 10:01 | 0 | ... |
| CJ05 | 3.5 | 8.0 | 1 | 10 | W FACILITY 2 | 2019/7/7 10:01 | 0 | ... |
| ... | ... | ... |  | ... | ... | ... | ... | ... |
| DJ01 | 1.0 | 1.5 | 0 | 2 | A FACILITY 2 | 2019/7/7 10:02 | 0 | ... |
| ... | ... | ... |  | ... | ... | ... | ... | ... |

[FIG. 9]
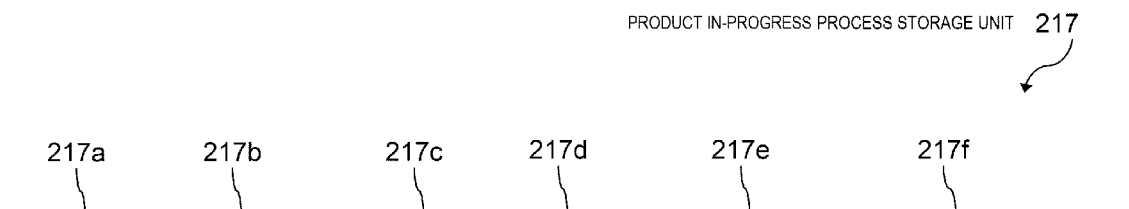

[FIG. 10]

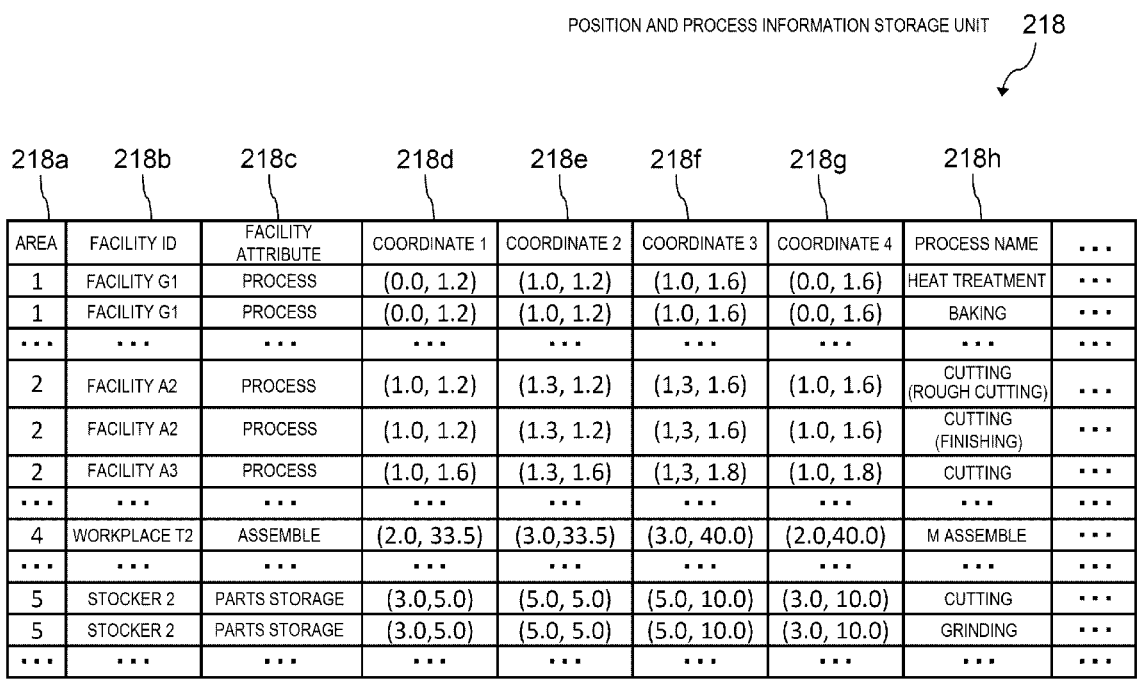

POSITION AND PROCESS INFORMATION STORAGE UNIT 218

| AREA | FACILITY ID | FACILITY ATTRIBUTE | COORDINATE 1 | COORDINATE 2 | COORDINATE 3 | COORDINATE 4 | PROCESS NAME | ... |
|---|---|---|---|---|---|---|---|---|
| 1 | FACILITY G1 | PROCESS | (0.0, 1.2) | (1.0, 1.2) | (1.0, 1.6) | (0.0, 1.6) | HEAT TREATMENT | ... |
| 1 | FACILITY G1 | PROCESS | (0.0, 1.2) | (1.0, 1.2) | (1.0, 1.6) | (0.0, 1.6) | BAKING | ... |
| ... | ... | ... | ... | ... | ... | ... | ... | ... |
| 2 | FACILITY A2 | PROCESS | (1.0, 1.2) | (1.3, 1.2) | (1,3, 1.6) | (1.0, 1.6) | CUTTING (ROUGH CUTTING) | ... |
| 2 | FACILITY A2 | PROCESS | (1.0, 1.2) | (1.3, 1.2) | (1,3, 1.6) | (1.0, 1.6) | CUTTING (FINISHING) | ... |
| 2 | FACILITY A3 | PROCESS | (1.0, 1.6) | (1.3, 1.6) | (1,3, 1.8) | (1.0, 1.8) | CUTTING | ... |
| ... | ... | ... | ... | ... | ... | ... | ... | ... |
| 4 | WORKPLACE T2 | ASSEMBLE | (2.0, 33.5) | (3.0, 33.5) | (3.0, 40.0) | (2.0, 40.0) | M ASSEMBLE | ... |
| ... | ... | ... | ... | ... | ... | ... | ... | ... |
| 5 | STOCKER 2 | PARTS STORAGE | (3.0, 5.0) | (5.0, 5.0) | (5.0, 10.0) | (3.0, 10.0) | CUTTING | ... |
| 5 | STOCKER 2 | PARTS STORAGE | (3.0, 5.0) | (5.0, 5.0) | (5.0, 10.0) | (3.0, 10.0) | GRINDING | ... |
| ... | ... | ... | ... | ... | ... | ... | ... | ... |

218a 218b 218c 218d 218e 218f 218g 218h

[FIG. 11]
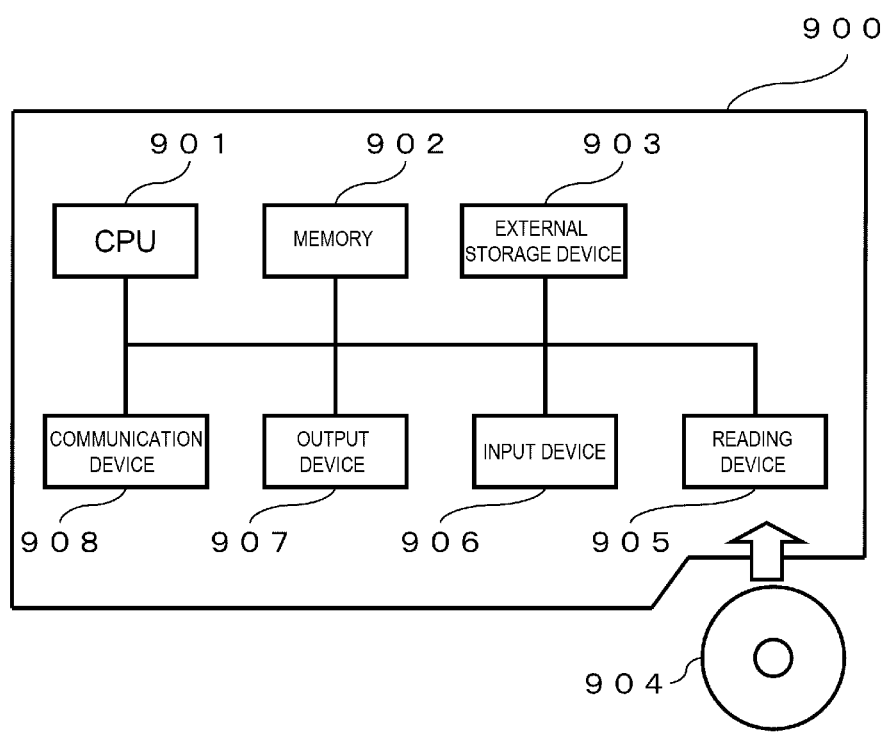

[FIG. 12]
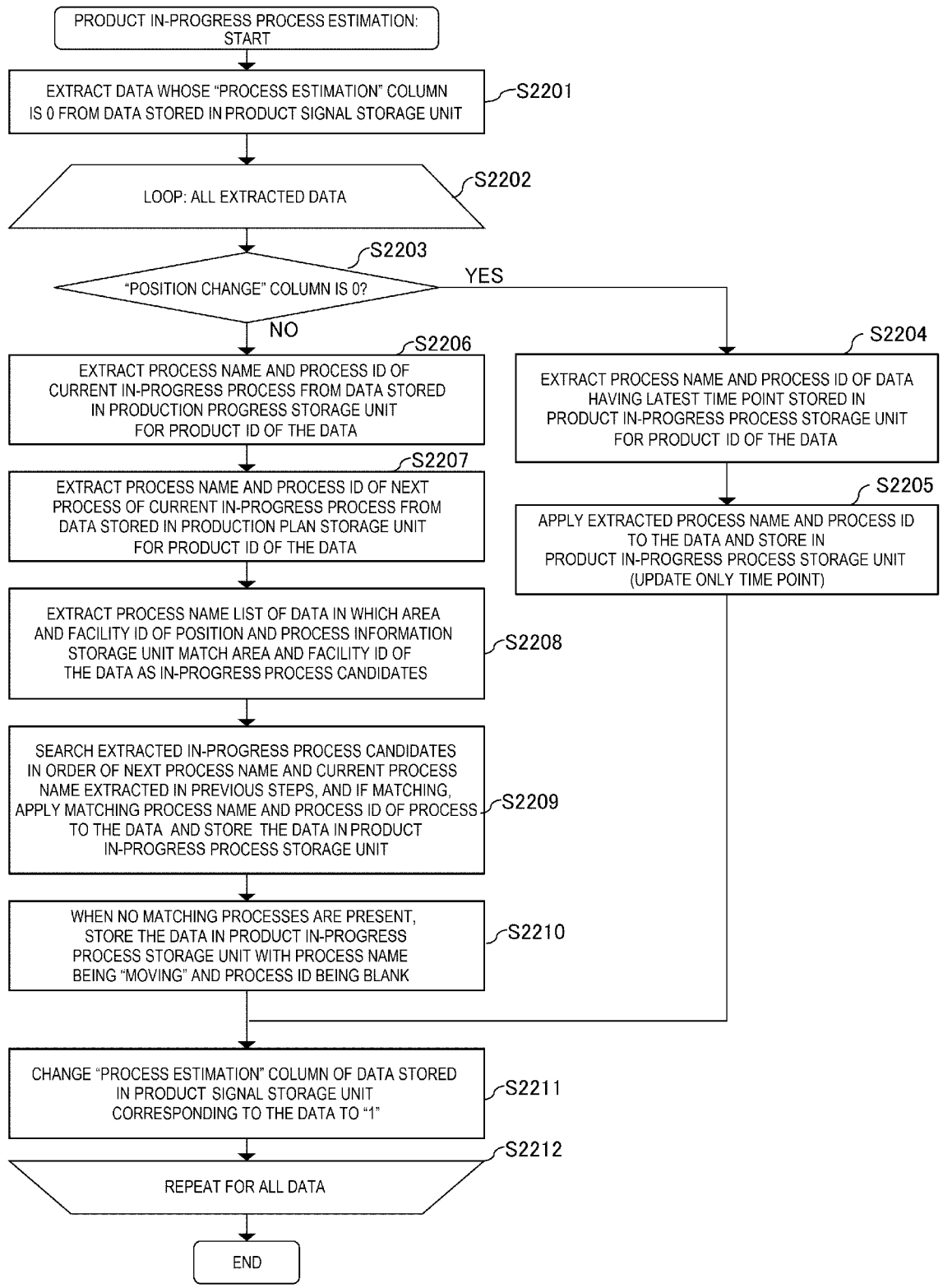

[FIG. 13]
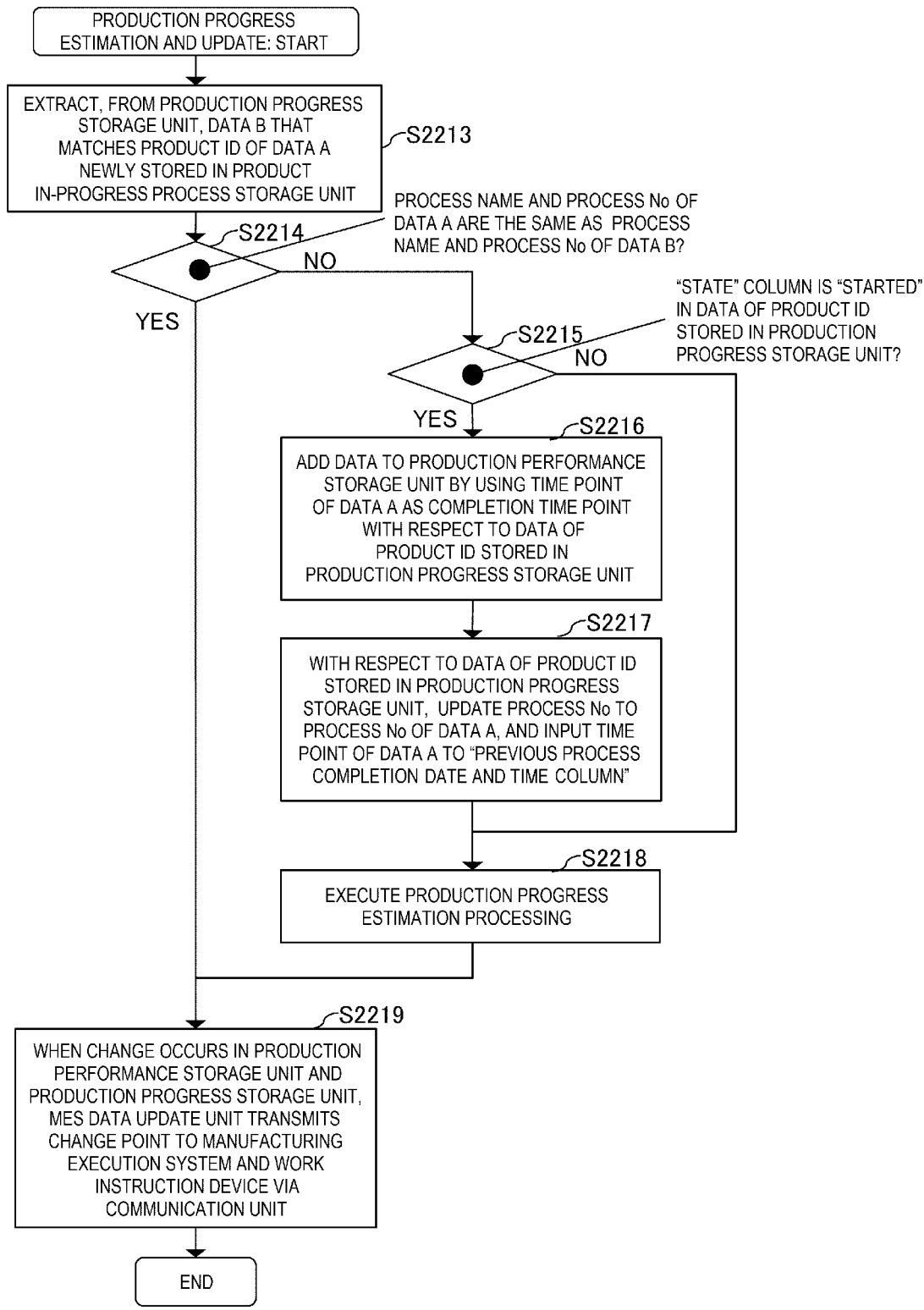

[FIG. 14]
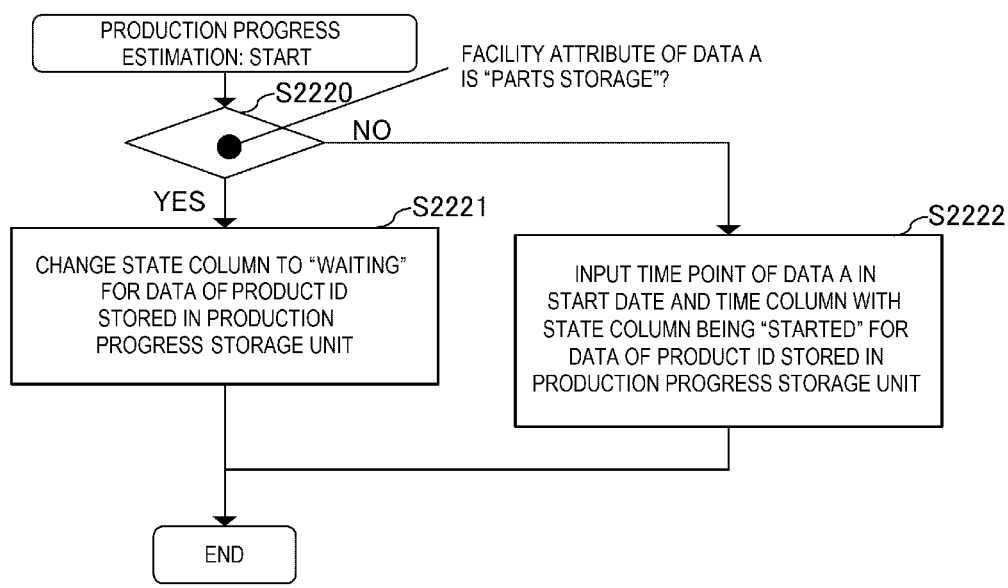

[FIG. 15]
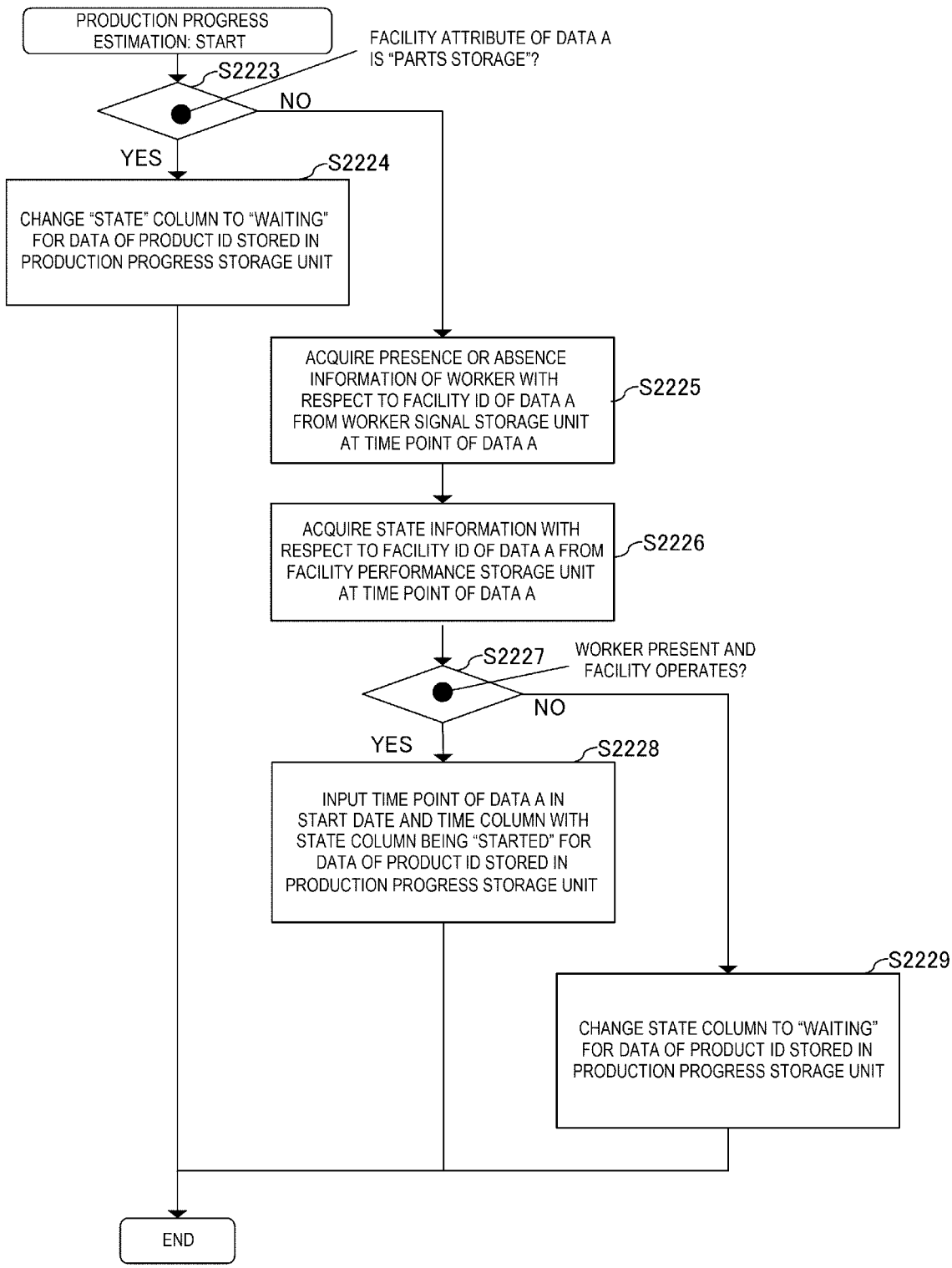

[FIG. 16]
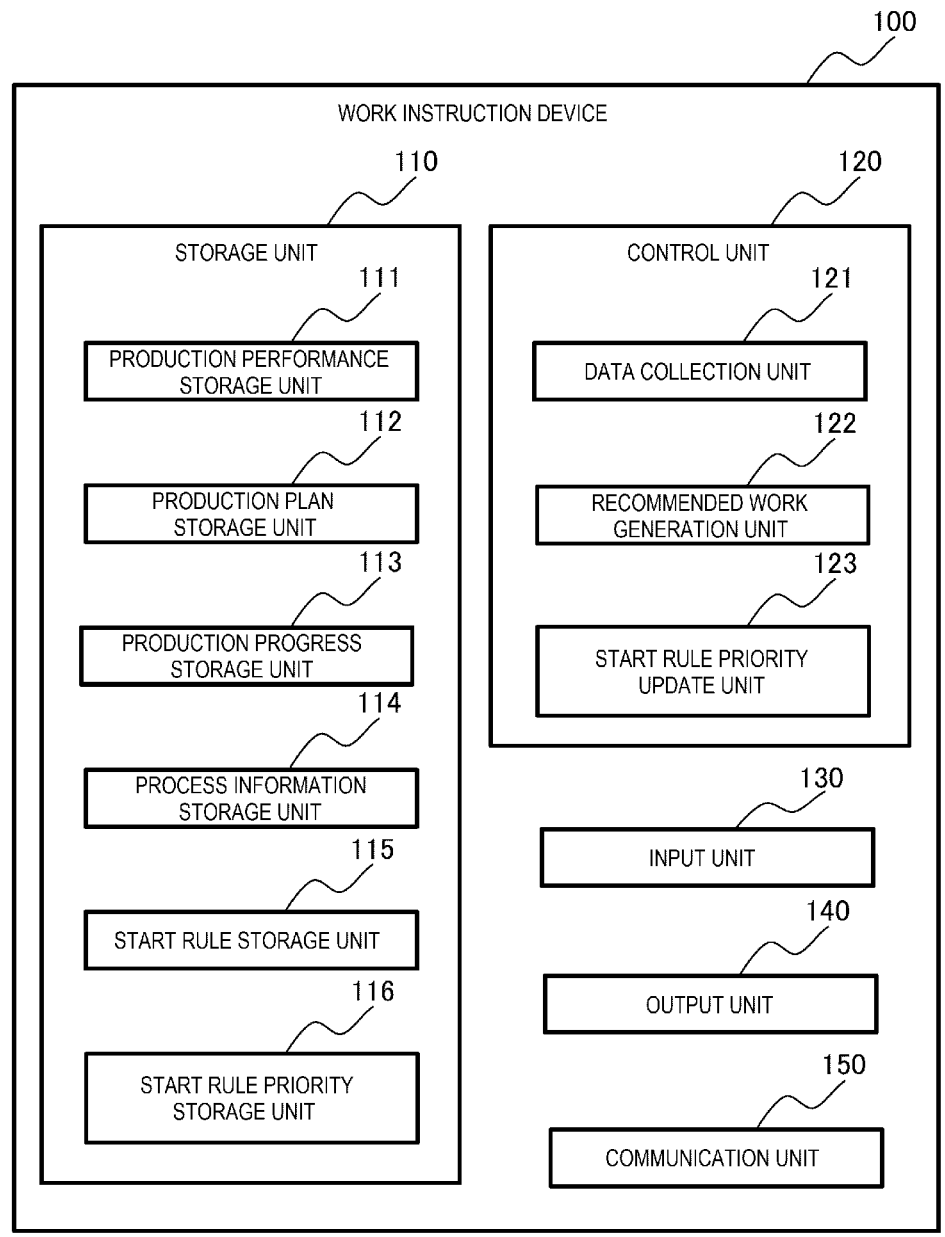

[FIG. 17]
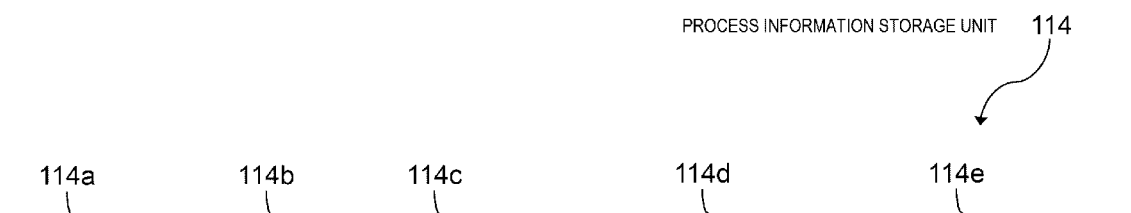

[FIG. 18]
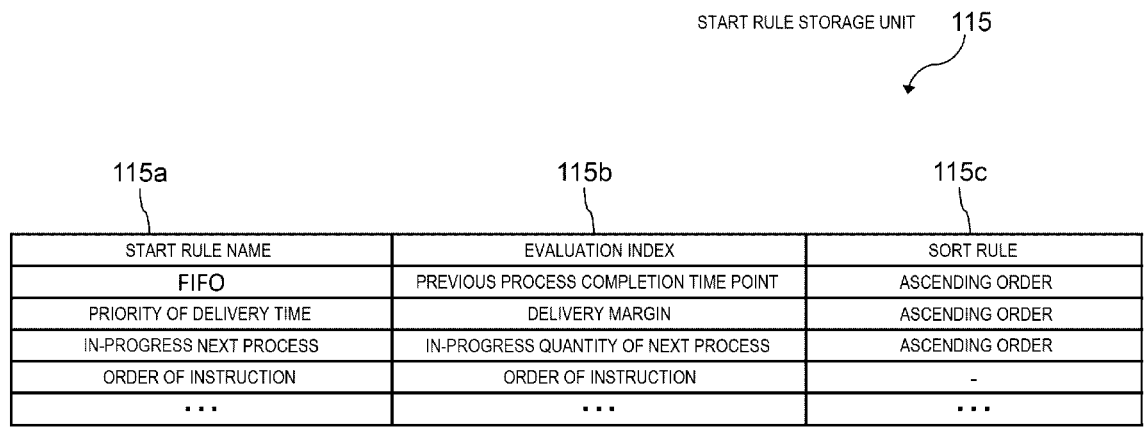

[FIG. 19]
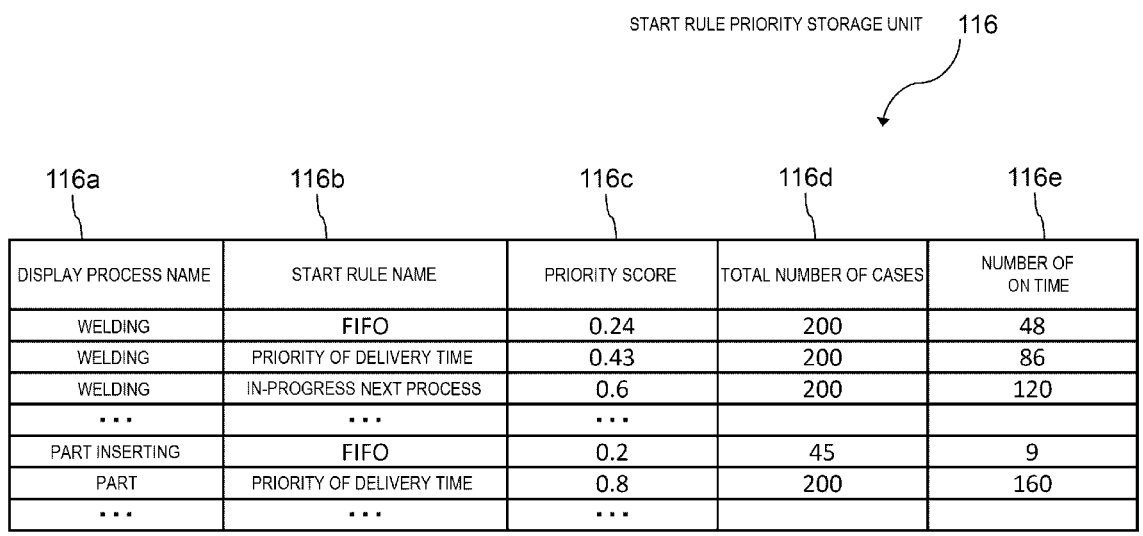

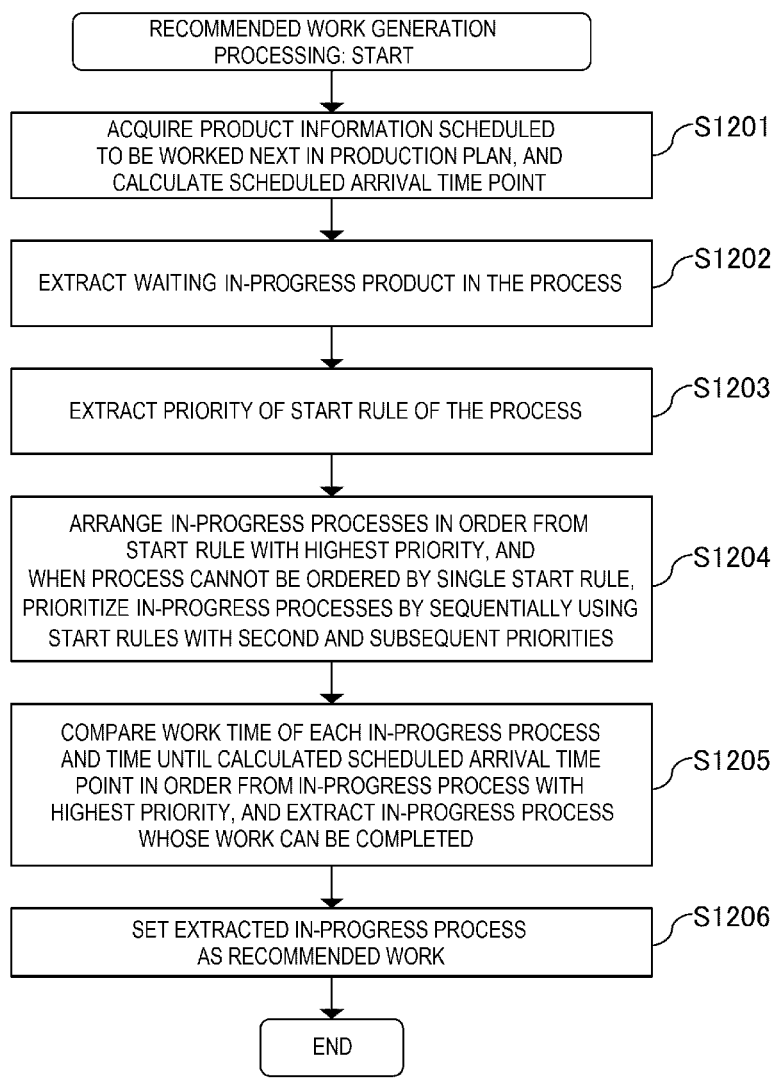
[FIG. 20]

[FIG. 21]
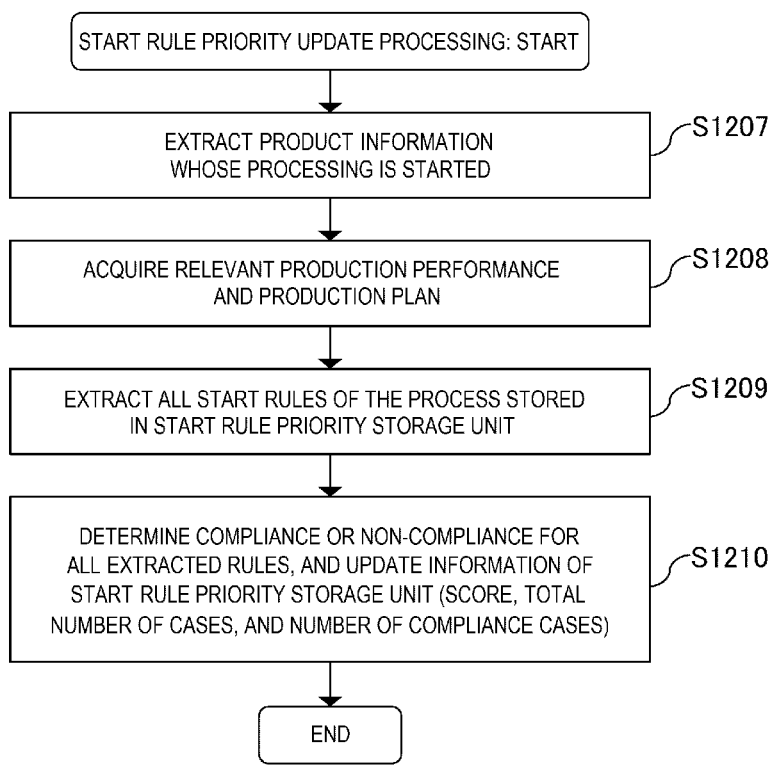

[FIG. 22]
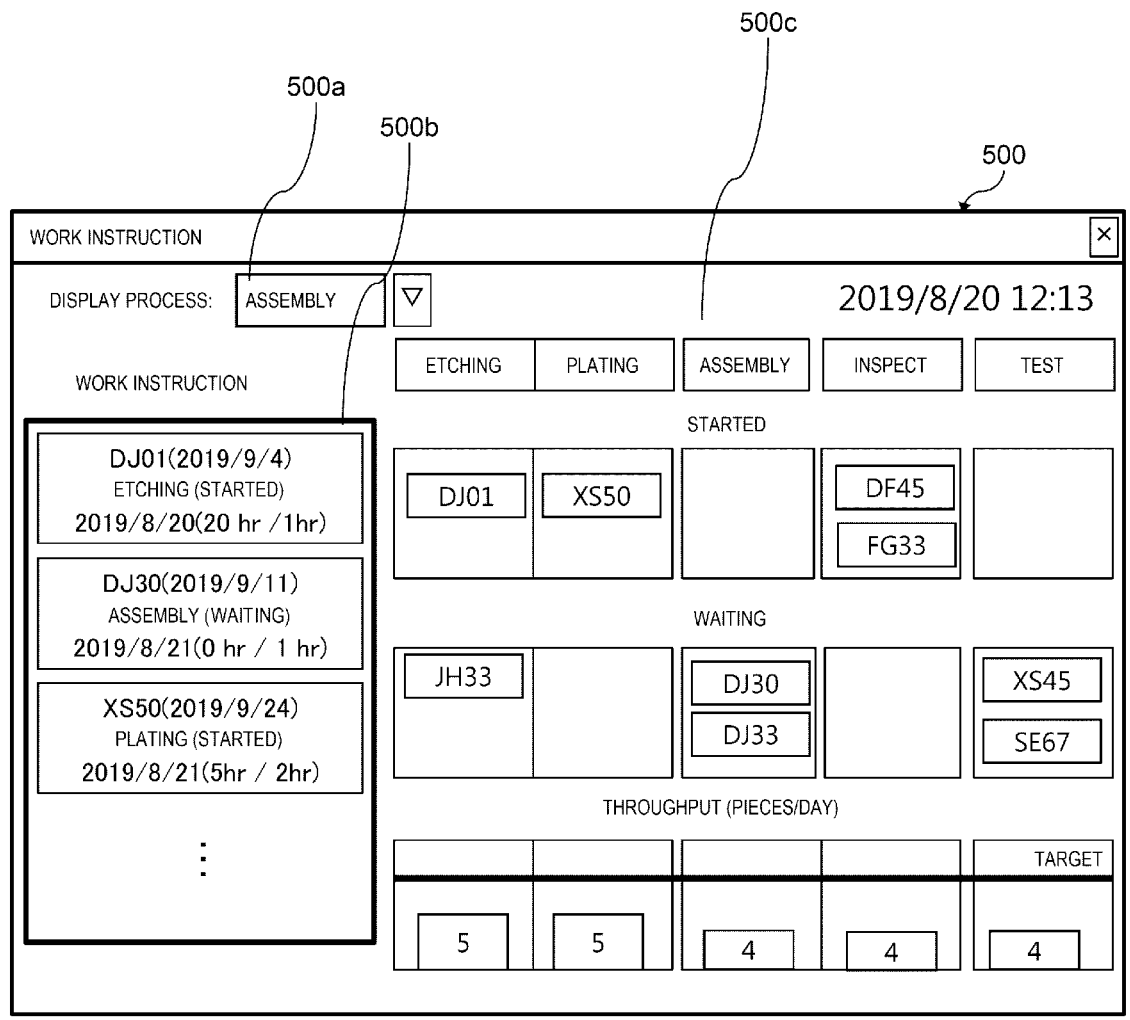

[FIG. 23]
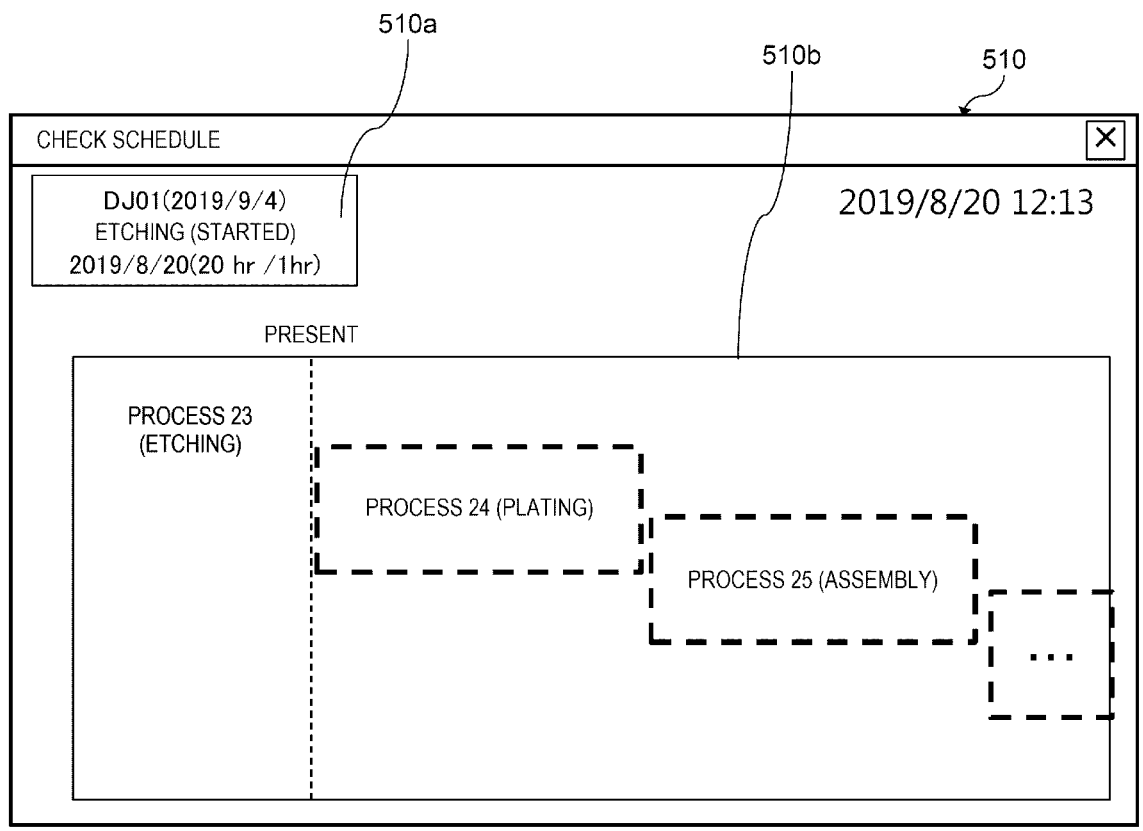

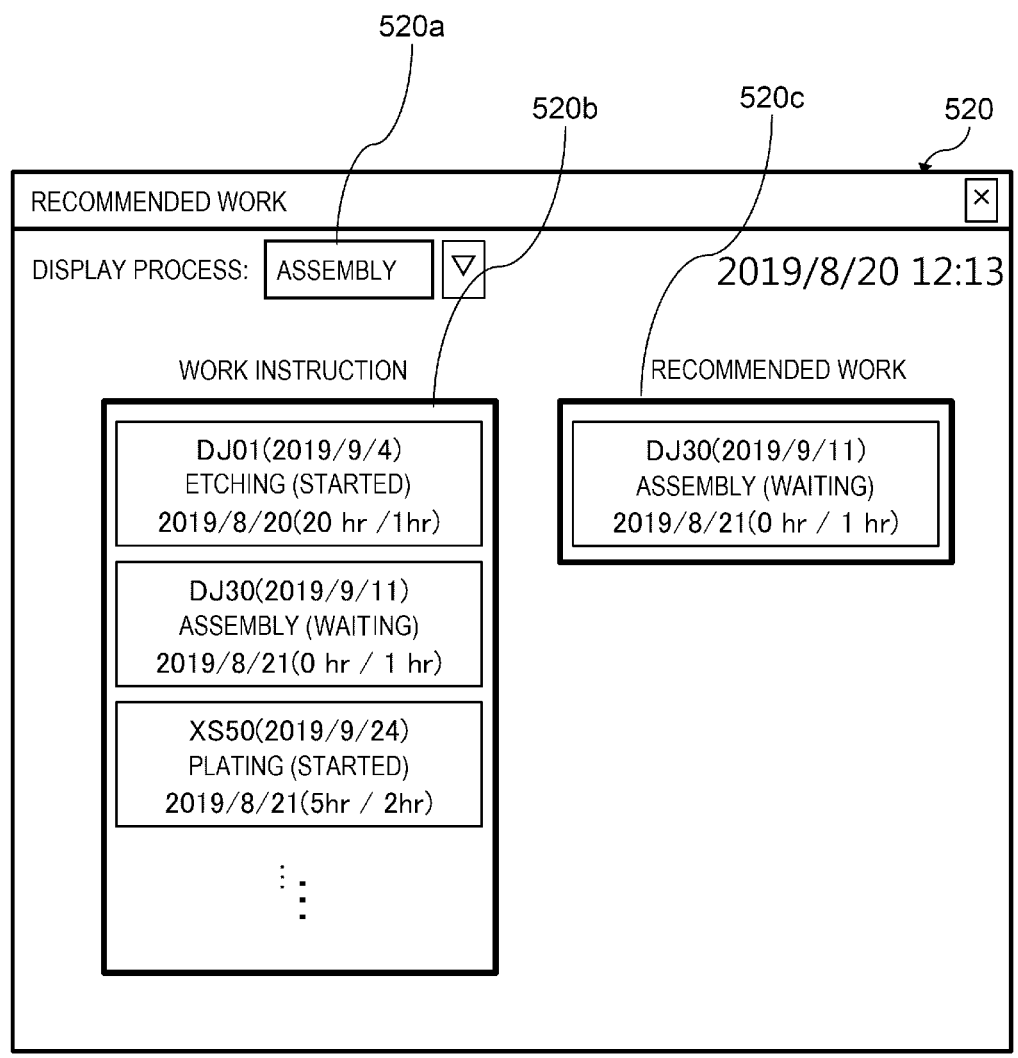
[FIG. 24]

WORK INSTRUCTION SYSTEM AND WORK INSTRUCTION METHOD

CROSS-REFERENCE TO RELATED APPLICATION

The present application claims priority from Japanese application JP 2019-224216, filed on Dec. 12, 2019, the contents of which is hereby incorporated by reference into this application.

TECHNICAL FIELD

The present invention relates to a work instruction system and a work instruction method.

BACKGROUND ART

JP-A-2018-180588 (PTL 1) discloses a background art of this technical field. PTL 1 discloses that in order to give a work instruction accurately and appropriately, an accurate work time is measured from an operation history of a facility and a work engagement time of a worker collected by an area sensor, and the work instruction is provided to the worker appropriately.

CITATION LIST

Patent Literature

PTL 1: JP-A-2018-180588

SUMMARY OF INVENTION

Technical Problem

The technique disclosed in PTL 1 proposes a system that combines the area sensor that detects that a worker is positioned in a work area determined for each facility and operation performance of the facility are combined to accurately acquire a start date and time and an end date and time of work, and to present an appropriate work instruction to the worker based on these pieces of information. However, the technique disclosed in PTL 1 determines whether the work is in-progress by using only information on presence or absence of the worker at a facility location and an operating status of the facility. Therefore, it may falsely detect the start date and time and the end date and time of the work when a part or a product as a work target is absent.

An object of the invention is to provide an accurate and appropriate work instruction in accordance with progress of a production site.

Solution to Problem

The present application includes a plurality of devices for solving at least a part of the problems described above. An example of the devices is as follows. In order to solve the above problems, in a work instruction system according to one aspect of the invention including a production progress management device and a work instruction device. The work instruction system is characterized by: the production progress management device includes a communication unit configured to communicate with the work instruction device, a product signal storage unit configured to store a product signal including position information of a product, a product in-progress process estimation unit configured to estimate an in-progress process of the product using the position information of the product, and a production progress estimation and update unit configured to estimate production progress of the product in accordance with a change in the position information of the product and update production progress information, and the work instruction device includes a communication unit configured to communicate with the production progress management device, a production progress storage unit configured to store the production progress information, a data collection unit configured to obtain progress management information updated from the production progress management device via the communication unit, a recommended work generation unit configured to generate recommended work information by using the updated production progress information for a predetermined product, and an output unit configured to display a work instruction based on a production plan of the product and the recommended work information.

Advantageous Effect

According to the invention, it is possible to provide an accurate and appropriate work instruction in accordance with progress of a production site. As a result, it is possible to optimize production indices in accordance with a purpose, such as improvement of an operation rate of a manufacturing device, increase of a production volume, reduction of manufacturing lead time, and compliance of delivery time, thereby implementing a manufacturing site with high productivity. Problems, configurations and effects other than those described above will be clarified by description of the following embodiment.

BRIEF DESCRIPTION OF DRAWINGS

FIG. 1 is a diagram showing a configuration example of a work instruction system according to a first embodiment of the invention.

FIG. 2 is a diagram showing a configuration example of a production progress management device.

FIG. 3 is a diagram showing an example of a data structure of a production performance storage unit.

FIG. 4 is a diagram showing an example of a data structure of a production plan information storage unit.

FIG. 5 is a diagram showing an example of a data structure of a production progress storage unit.

FIG. 6 is a diagram showing an example of a data structure of a worker signal storage unit.

FIG. 7 is a diagram showing an example of a data structure of a facility performance storage unit.

FIG. 8 is a diagram showing an example of a data structure of a product signal storage unit.

FIG. 9 is a diagram showing an example of a data structure of a product in-progress process storage unit.

FIG. 10 is a diagram showing an example of a data structure of a position and process information storage unit.

FIG. 11 is a diagram showing an example of a hardware configuration of the production progress management device.

FIG. 12 is a diagram showing an example of a flow of a product in-progress process estimation processing.

FIG. 13 is a diagram showing an example of a flow of production progress estimation and update processing.

FIG. 14 is a diagram showing an example of a flow of a production progress estimation processing in the production progress estimation and update processing.

FIG. 15 is a diagram showing another example of the flow of the production progress estimation processing.

FIG. 16 is a diagram showing a configuration example of a work instruction device.

FIG. 17 is a diagram showing an example of a data structure of a process information storage unit.

FIG. 18 is a diagram showing an example of a data structure of a start rule storage unit.

FIG. 19 is a diagram showing an example of a data structure of a start rule priority storage unit.

FIG. 20 is a diagram showing an example of a flow of a recommended work generation processing.

FIG. 21 is a diagram showing an example of a flow of a start rule priority update processing.

FIG. 22 is a diagram showing an example of an output screen of the recommended work generation processing.

FIG. 23 is a diagram showing another example of the output screen of the recommended work generation processing.

FIG. 24 is a diagram showing another example of the output screen of the recommended work generation processing.

DESCRIPTION OF EMBODIMENTS

Hereinafter, an embodiment of the invention will be described with reference to the drawings. The same components are denoted by the same reference symbols in principle throughout all the drawings for describing the embodiment, and the repetitive description thereof is omitted. In the following embodiment, it is needless to say that constituent elements (including element steps and the like) are not necessarily essential unless when particularly specified and considered to be obviously essential in principle. In addition, it is needless to say that expressions "formed of A", "made of A", "having A", and "including A" do not exclude elements other than A unless when particularly specified that A is the only element thereof. Similarly, in the following embodiment, shapes, position relationships, and the like of constituent elements and the like include those substantially approximate or similar to the shapes or the like unless when particularly specified and considered to be obviously not the case in principle.

In a factory in a company that runs a manufacturing industry, with respect to a product to be produced, a future production plan is often drafted based on a production facility used in each production process and time input in each production facility, so that daily production activities are performed in accordance with the production plan. In such a manufacturing site, due to various factors such as workers, facilities, and products themselves, various delays with respect to the plan can occur.

Therefore, it is difficult to perform the production activities according to the production plan. If a flow shop that arranges manufacturing facilities according to a flow of production is adopted as a factory layout, since an upstream process and a downstream process are physically adjacent to each other, a delay occurring in the upstream process and trouble occurring in the downstream process can be relatively easily checked from other processes. For example, it has a feature that when a worker newly starts work in his or her own process under charge, even if the work of the process under charge cannot be performed according to the production plan due to the delay of work in the upstream process, it is easy to predict when a work target such as a part or a product instructed in the production plan will arrive in the process based on observation by visual observation, inquiry, or the like by the worker.

However, in a factory in which the manufacturing facilities are collectively arranged for each function like a job shop, since the upstream process and the downstream process do not match a physical layout, it can be said as relatively difficult to know the delay occurring in the upstream process and the trouble occurring in the downstream process. In order to know the delay and trouble at early stages, it is necessary to accurately acquire and utilize a production progress status.

In the technique disclosed in PTL 1, not only the start date and time and the end date and time of the work as described above may be falsely detected, but also when the technique is applied to work such as assembly that does not necessarily require facilities, the start date and time and the end date and time of the work cannot be accurately estimated from only presence or absence information of the worker.

FIG. 1 is a diagram showing a configuration example of a work instruction system according to a first embodiment of the invention. A work instruction system 10 includes a work instruction device 100 and a production progress management device 200, and a network 999 that connects the work instruction device 100 and the production progress management device 200 to each other to enable communication. The work instruction system 10 connects with an external manufacturing execution system (MES) 300 via the network 999 to communicate with each other.

The network 999 is, for example, any one of a communication network using a part or all of a general public line such as a local area network (LAN), a wide area network (WAN), a virtual private network (VPN), or Internet, or a mobile phone communication network.

The work instruction device 100 generates a work instruction based on production information acquired from the manufacturing execution system 300 and progress information acquired from the production progress management device 200. The production progress management device 200 manages the production progress based on the production information acquired from the manufacturing execution system 300, estimates and updates the progress in accordance with a status, and returns an updated result to the manufacturing execution system 300. The work instruction device 100 and the production progress management device 200 will be described later in detail.

The manufacturing execution system 300 manages all pieces of information related to production execution of a factory including manufacturing performance information, production plan information, production progress information, and the like, and transmits the manufacturing performance information, the production plan information, the production progress information, and the like to the work instruction device 100 and the production progress management device 200 at a predetermined time or in response to requests from the work instruction device 100 and the production progress management device 200.

FIG. 2 is a diagram showing a configuration example of the production progress management device. The production progress management device 200 includes a storage unit 210, a control unit 220, an input unit 230, an output unit 240, and a communication unit 250.

The storage unit 210 includes a production performance storage unit 211, a production plan storage unit 212, a production progress storage unit 213, a worker signal storage unit 214, a facility performance storage unit 215, a product signal storage unit 216, a product in-progress process storage unit 217, and a position and process information storage unit 218.

The production performance storage unit 211 stores information for specifying work (processing) of a process, a date and time at which the work (processing) is started, the date and time at which the work (processing) is completed, a production facility that performs the work (processing), and a worker who performs the work (processing) for each product such as a part or a product.

FIG. 3 is a diagram showing an example of a data structure of a production performance storage unit 211. The production performance storage unit 211 stores information acquired from the manufacturing execution system 300 by an MES data collection unit 221 to be described later, and is updated as needed in a production progress estimation and update processing to be described later.

The production performance storage unit 211 includes a product ID column 211a, a type name column 211b, a number column 211c, a process name column 211d, a process No column 211e, a previous process completion date and time column 211f, a start date and time column 211g, a completion date and time column 211h, a facility ID column 211i, and a worker ID column 211k.

The product ID column 211a, the type name column 211b, the number column 211c, the process name column 211d, the process No column 211e, the previous process completion date and time column 211f, the start date and time column 211g, the completion date and time column 211h, the facility ID column 211i, and the worker ID column 211k are associated with each other.

The product ID column 211a stores information for specifying a product ID, which is identification information capable of uniquely identifying a product such as each product or part.

The type name column 211b stores information for specifying a type of the product specified in the product ID column 211a.

The number column 211c stores information for specifying a quantity of products included in the products specified in the product ID column 211a.

The process name column 211d stores information for specifying a process name for identifying a process in which the product specified in the product ID column 211a is processed.

The process No column 211e stores information for specifying the number, counting from a first process, of the process in the process name column 211d with respect to the product specified in the product ID column 211a.

The previous process completion date and time column 211f stores information for specifying the date and time at which a previous process of the process specified in the process name column 211d with respect to the product specified in the product ID column 211a is completed.

The start date and time column 211g stores information for specifying the date and time at which a processing of the process specified in the process name column 211d with respect to the product specified in the product ID column 211a is started.

The completion date and time column 211h stores information for specifying the date and time at which the processing of the process specified in the process name column 211d with respect to the product specified in the product ID column 211a is completed.

The facility ID column 211i stores information for specifying a facility ID used in the processing of the process specified in the process name column 211d in a period from the start date and time specified in the start date and time column 211g to the end date and time specified in the completion date and time column 211h of the product specified in the product ID column 211a.

The worker ID column 211k stores information for specifying a worker ID in charge of the processing of the process specified in the process name column 211d in the period from the start date and time specified in the start date and time column 211g to the completion date and time specified in the completion date and time column 211h of the product specified in the product ID column 211a.

The description will return to FIG. 2. The production plan storage unit 212 stores a production plan.

FIG. 4 is a diagram showing an example of a data structure of the production plan storage unit. The production plan storage unit 212 stores information acquired from the manufacturing execution system 300 by the MES data collection unit 221 to be described later.

The production plan storage unit 212 includes a product ID column 212a, a type name column 212b, a number column 212c, a process name column 212d, a process No column 212e, a scheduled start date and time column 212f, a scheduled completion date and time column 212g, a facility ID column 212h, a worker ID column 212i, and a planned date column 212k.

The product ID column 212a, the type name column 212b, the number column 212c, the process name column 212d, the process No column 212e, the scheduled start date and time column 212f, the scheduled completion date and time column 212g, the facility ID column 212h, the worker ID column 212i, and the planned date column 212k are associated with each other.

The product ID column 212a stores information for specifying a product ID, which is identification information capable of uniquely identifying a product such as each product or part.

The type name column 212b stores information for specifying a type of the product specified in the product ID column 212a.

The number column 212c stores information for specifying a quantity of products included in the products specified in the product ID column 212a.

The process name column 212d stores information for specifying a process name for identifying a process in which the product specified in the product ID column 212a is processed.

The process No column 212e stores information for specifying the number, counting from a first process, of the process in the process name column 212d with respect to the product specified in the product ID column 212a.

The scheduled start date and time column 212f stores information for specifying a planned value of a date and time at which the processing of the process specified in the process name column 212d with respect to the product specified in the product ID column 212a is started.

The scheduled completion date and time column 212g stores information for specifying a planned value of a date and time at which the processing of the process specified in the process name column 212d with respect to the product specified in the product ID column 212a is completed.

The facility ID column 212h stores information for specifying a facility ID of a plan used in the processing of the process specified in the process name column 212d in a period from a scheduled start date and time specified in the scheduled start date and time column 212f to a scheduled completion date and time specified in the scheduled completion date and time column 212g of the product specified in the product ID column 212a.

The worker ID column 212i stores information for specifying a worker ID of the plan in charge of the processing of the process specified in the process name column 212d in the period from the scheduled start date and time specified in the scheduled start date and time column 212f to the scheduled completion date and time specified in the scheduled completion date and time column 212g of the product specified in the product ID column 212a.

The planned date column 212k stores information for specifying a planned date for the processing in the charge of the worker with the worker ID specified in the worker ID column 212i using a facility with the facility ID specified in the facility ID column 212h in the process specified in the process name column 212d in the period from the scheduled start date and time specified in the scheduled start date and time column 212f to the scheduled completion date and time specified in the scheduled completion date and time column 212g with respect to the product specified in the product ID column 212a.

The description will return to FIG. 2. The production progress storage unit 213 stores information on a position and state of the in-progress product in the factory.

FIG. 5 is a diagram showing an example of a data structure of the production progress storage unit 213. The production progress storage unit 213 stores information acquired from the manufacturing execution system 300 by the MES data collection unit 221 to be described later, and is then updated as needed by a production progress estimation and update unit 227 to be described later.

The production progress storage unit 213 includes a product ID column 213a, a type name column 213b, a number column 213c, an input date column 213d, a completion request date column 213e, a process No column 213f, a process name column 213g, a state column 213h, a start date and time 213i, and a previous process completion date and time column 213k.

The product ID column 213a, the type name column 213b, the number column 213c, the input date column 213d, the completion request date column 213e, the process No column 213f, the process name column 213g, the state column 213h, the start date and time 213i, and the previous process completion date and time column 213k are associated with each other.

The product ID column 213a stores information for specifying a product ID, which is identification information capable of uniquely identifying each product such as a product or a part.

The type name column 213b stores information for specifying a type of the product specified in the product ID column 213a.

The number column 213c stores information for specifying a quantity of products included in the products specified in the product ID column 213a.

The input date column 213d stores information for specifying a date on which the product specified in the product ID column 213a is input in the first process in a case of already being produced, or information for specifying an input date in a case before the input.

The completion request date column 213e stores information for specifying a completion date of the product specified in the product ID column 213a.

The process No column 213f stores information for specifying the number, counting from the first process, of the process in which the product specified in the product ID column 213a is in-progress. In the case before the input of the product specified in the product ID column 213a, the process No column 213f is a blank column.

The process name column 213g stores information for specifying a process name for identifying a process in which the product specified in the product ID column 213a is processed.

The state column 213h stores information for specifying a state of the product specified in the product ID column 213a. In the case before the input of the product specified in the product ID column 213a, the state column 213h is a blank column.

The start date and time column 213i stores information for specifying a date and time at which the processing of the process specified in the process No column 213f with respect to the product specified in the product ID column 213a is started. In the case before the input of the product specified in the product ID column 213a or in a case where the state column 213h is waiting or stopped, the start date and time column 213i is a blank column.

The previous process completion date and time column 213k stores information for specifying a date and time at which a processing of a previous process of the process specified in the process No column 213f with respect to the product specified in the product ID column 213a is completed.

The description will return to FIG. 2. The worker signal storage unit 214 stores information for specifying a position of the worker and a change thereof and information for specifying the used facility.

FIG. 6 is a diagram showing an example of a data structure of the worker signal storage unit. The worker signal storage unit 214 stores position information of the worker in time series. The worker signal storage unit 214 stores information related to the position of the worker collected by a worker signal collection unit 223 to be described later.

Specifically, the worker signal storage unit 214 includes a worker ID column 214a, an X coordinate column 214b, a Y coordinate column 214c, a position change column 214d, an area column 214e, a facility ID column 214f, and a date and time column 214g.

The worker ID column 214a, the X coordinate column 214b, the Y coordinate column 214c, the position change column 214d, the area column 214e, the facility ID column 214f, and the date and time column 214g are associated with each other.

The worker ID column 214a stores information for specifying a worker ID, which is identification information capable of uniquely identifying a person in charge of the work in each manufacturing process of a product.

The X coordinate column 214b stores information for specifying an X coordinate on a plane in a workplace of the worker specified in the worker ID column 214a. A position in the workplace can be shown using two axes including an X axis and a Y axis that are orthogonal to each other, and positions on the axes are respectively referred to as an X coordinate and a Y coordinate.

The Y coordinate column 214c stores information for specifying a Y coordinate on the plane in the workplace of the worker specified in the worker ID column 214a.

The position change column 214d stores information for specifying whether a change occurs in a position on the plane in the workplace of the worker specified in the worker ID column 214a. Whether a change occurs in the position is determined in accordance with changes in the X coordinate and the Y coordinate, but when a change amount in the position is very small, it is often considered that no changes occur in the position. For example, when moving only one step, it is often considered that the position does not change. Therefore, for example, when change amounts of the X coordinate and the Y coordinate of the position information of the worker are less than a predetermined threshold value, it may be considered that no changes occur in the position, or when an area preliminarily partitioned at a predetermined position in the workplace does not change, it may also be considered that no changes occur in the position.

The area column 214e stores information indicating which one among predetermined areas on the plane in the workplace the worker specified in the worker ID column 214a is in.

The facility ID column 214f stores information indicating a manufacturing facility in the workplace used by the worker specified in the worker ID column 214a.

The date and time column 214g stores information for specifying a date and a time at which a worker signal is recorded.

The description will now return to FIG. 2. The facility performance storage unit 215 stores time series information related to state information of the facility.

FIG. 7 is a diagram showing an example of a data structure of the facility performance storage unit 215. The facility performance storage unit 215 stores information collected by a facility performance collection unit 224 to be described later.

Specifically, the facility performance storage unit 215 includes a facility ID column 215a, a state column 215b, a state change column 215c, and a date and time column 215d.

The facility ID column 215a, the state column 215b, the state change column 215c, and the date and time column 215d are associated with each other.

The facility ID column 215a stores information for specifying a facility ID which is identification information capable of uniquely identifying a manufacturing facility responsible for part of the manufacturing process of each product.

The state column 215b stores information for specifying an operating state of the facility specified in the facility ID column 215a. The operating state of the manufacturing facility includes a plurality of states such as "stopped", "idle", and "operating".

The state change column 215c stores information for specifying whether a change occurs in the operating state of the facility specified in the facility ID column 215a. Whether a change occurs in the operating state is determined in accordance with transition of the state, but it is often considered that no changes occur in the state even when a plurality of states are present in an output in the operating state (temperature, speed, throughput, and the like). For example, even when a speed changes from an output of 5 kilometer per hour to an output of 7 kilometer per hour, it is often considered that no changes occur in the state (both are the operating state). However, in some situations, depending on the manufacturing facilities, it should be considered that the state changes. Therefore, a definition of the change of the state may be provided for each manufacturing facility.

The date and time column 215d stores information for specifying a date and a time at which facility performance is recorded.

The description will return to FIG. 2. The product signal storage unit 216 stores position information of a product such as a part or a product in time series.

FIG. 8 is a diagram showing an example of a data structure of the product signal storage unit. The product signal storage unit 216 stores information collected by a product signal collection unit 225 to be described later.

Specifically, the product signal storage unit 216 includes a product ID column 216a, an X coordinate column 216b, a Y coordinate column 216c, a position change column 216d, an area column 216e, a facility ID column 216f, a date and time column 216g, and a process estimation column 216h.

The product ID column 216a, the X coordinate column 216b, the Y coordinate column 216c, the position change column 216d, the area column 216e, the facility ID column 216f, the date and time column 216g, and the process estimation column 216h are associated with each other.

The product ID column 216a stores information for specifying a product ID, which is identification information capable of uniquely identifying an individual product.

The X coordinate column 216b stores information for specifying an X coordinate on a plane in the workplace of the product specified in the product ID column 216a. A position in the workplace can be shown using two axes including an X axis and a Y axis that are orthogonal to each other, and positions on the axes are respectively referred to as an X coordinate and a Y coordinate.

The Y coordinate column 216c stores information for specifying a Y coordinate on a plane in the workplace of the product specified by the product ID column 216a.

The position change column 216d stores information for specifying whether a change occurs in the position on the plane in the workplace of the product specified in the product ID column 216a. Whether a change occurs in the position is determined in accordance with changes in the X coordinate and the Y coordinate, but when a change amount in the position is very small, it is often considered that no changes occur in the position. For example, when moving only on the same work table, it is often considered that the position does not change. Therefore, for example, when change amounts of the X coordinate and the Y coordinate of the position information of the product are less than predetermined threshold values, it may be considered that no changes occur in the position, or when an area preliminarily partitioned at a predetermined position in the workplace does not change, it may be also considered that no changes occur in the position.

The area column 216e stores information indicating which one among predetermined areas on the plane in the workplace the product specified in the product ID column 216a is in.

The facility ID column 216f stores information indicating a manufacturing facility in the workplace operating for the product specified in the product ID column 216a.

The date and time column 216g stores information for specifying a date and a time at which a product signal is recorded.

The process estimation column 216h stores information indicating whether a process estimation processing is performed. For example, when the process estimation processing is performed, "1" is stored, and otherwise "0" is stored.

The description will return to FIG. 2. The product in-progress process storage unit 217 stores information on an in-progress process of the product such as a part or a product in time series.

FIG. 9 is a diagram showing an example of a data structure of the product in-progress process storage unit. The product in-progress process storage unit 217 stores information stored in the product signal storage unit 216 by a product in-progress process estimation unit 226 to be described later, and information generated based on information stored in the position and process information storage unit 218 to be described later.

Specifically, the product in-progress process storage unit 217 includes a product ID column 217a, a facility ID column 217b, a process name column 217c, a process ID column 217d, a date and time column 217e, and a position change column 217f.

The product ID column 217a, the facility ID column 217b, the process name column 217c, the process ID column 217d, the date and time column 217e, and the position change column 217f are associated with each other.

The product ID column 217a stores information for specifying a product ID, which is identification information capable of uniquely identifying an individual product.

The facility ID column 217b stores information indicating a manufacturing facility in the workplace operating for the product specified in the product ID column 217a.

The process name column 217c stores information for specifying a process name for identifying a process in which the product specified in the product ID column 217a is processed.

The process ID column 217d stores information for specifying the number, counting from a first process, of the process in the process name column 217c with respect to the product specified in the product ID column 217a.

The date and time column 217e stores information for specifying a date and a time at which the record is recorded.

The position change column 217f stores information for specifying whether a change occurs in the position on the plane in the workplace of the product specified in the product ID column 217a.

The description will return to FIG. 2. The position and process information storage unit 218 stores information that associates the position information and the in-progress process.

FIG. 10 is a diagram showing an example of a data structure of the position and process information storage unit. The position and process information storage unit 218 is updated by the product in-progress process estimation unit 226 to be described later.

The information stored in the position and process information storage unit 218 must be periodically updated so as to correspond to a change of process design information or a layout change of the factory.

The position and process information storage unit 218 includes an area column 218a, a facility ID column 218b, a facility attribute column 218c, a coordinate 1 column 218d, a coordinate 2 column 218e, a coordinate 3 column 218f, a coordinate 4 column 218g, and a process name column 218h, and the columns are associated with each other.

The area column 218a stores information for identifying a predetermined area on the plane in the workplace.

The facility ID column 218b stores information indicating a manufacturing facility in the workplace which is disposed and operated in a specified area in the area column 218a.

The facility attribute column 218c stores information for specifying an attribute of the facility specified in the facility ID column 218b. For example, the facility attribute column 218c stores information of a process such as "processing", "assembly" and the like in which the facility is used, and information of an intermediate process between processes such as "parts storage" and the like in which the facility is used.

The coordinate 1 column 218d, the coordinate 2 column 218e, the coordinate 3 column 218f, and the coordinate 4 column 218g store information for specifying coordinates of four corners of the area specified in the area column 218a.

The process name column 218h stores information for specifying a process name for identifying a process performed in the area specified in the area column 218a.

The description will return to FIG. 2. The control unit 220 of the production progress management device 200 includes the MES data collection unit 221, an MES data update unit 222, the worker signal collection unit 223, the facility performance collection unit 224, the product signal collection unit 225, the product in-progress process estimation unit 226, and the production progress estimation and update unit 227.

The MES data collection unit 221 acquires and updates information stored in the production performance storage unit 211, the production plan storage unit 212, and the production progress storage unit 213 from the manufacturing execution system 300 at a predetermined time (for example, every day) or at a designated time.

The MES data update unit 222, when designated by the production progress estimation and update unit 227, transfers the information stored in the production performance storage unit 211 and the production progress storage unit 213 for updating the manufacturing execution system 300.

The worker signal collection unit 223 collects a position signal of the worker at a predetermined time (for example, every day) or at a designated time, and stores the collected position signal in the worker signal storage unit 214. Here, a method of collecting the position signal of the worker uses methods capable of acquiring information stored in the worker ID column 214a, the X coordinate column 214b, the Y coordinate column 214c, and the date and time column 214g included in the worker signal storage unit 214, that is, the coordinates in the workplace and the date and time. The worker signal collection unit 223 uses the information stored in the position change column 214d and the information stored in the position and process information storage unit 218 to generate and store the information to be stored in the area column 214e and the facility ID column 214f, if necessary.

The facility performance collection unit 224 collects an operation signal that is performance of the facility at a predetermined time (for example, every day) or at a designated time, and stores the collected operation signal in the facility performance storage unit 215. Here, a method for collecting the facility performance uses methods capable of acquiring information of the facility ID column 215a, the state column 215b, and the date and time column 215d included in the facility performance storage unit 215, that is, the operating state and the date and time of the facility. The facility performance collection unit 224 specifies and stores the information stored in the state change column 215c, that is, whether a change occurs in the state since a previous collection, if necessary.

The product signal collection unit 225 collects a position signal of the product at a predetermined time (for example, every day) or at a designated time, and stores the collected position signal in the product signal storage unit 216. Here, a method for collecting the position signal of the product uses methods capable of acquiring information stored in the product ID column 216a, the X coordinate column 216b, the Y coordinate column 216c, and the date and time column 216g included in the product signal storage unit 216, that is, the coordinates in the workplace and the date and time. The product signal collection unit 225 uses the information stored in the position change column 216d and the information stored in the position and process information storage unit 218 to generate and store the information to be stored in the area column 216e and the facility ID column 216f, if necessary. When the product signal collection unit 225 stores data in the product signal storage unit 216, the product signal collection unit 225 sets an initial value of the process estimation column 216h included in the product signal storage unit 216 to "0 (zero)".

The product in-progress process estimation unit 226 generates information to be stored in the product in-progress process storage unit 217 in accordance with a flow of a product in-progress process estimation processing to be described later at a predetermined time (for example, every day) or at a designated time, and also updates the information of the product signal storage unit 216 in parallel.

The production progress estimation and update unit 227 generates information to be stored in the production performance storage unit 211 in accordance with a flow of a production progress estimation processing to be described later at a predetermined time (for example, every day) or at a designated time, and appropriately updates the information stored in the production progress storage unit 213 in parallel.

The input unit 230, for example, is displayed and operated on a screen so as to receive input information input by a keyboard or a mouse.

The output unit 240 generates, for example, screen information including information to be output as a result of performing a predetermined processing, and outputs the screen information to the work instruction device 100 and the manufacturing execution system. 300 via the communication unit 250.

The communication unit 250 transmits and receives information to and from other devices via the network 999.

FIG. 11 is a diagram showing an example of a hardware configuration of the production progress management device. The production progress management device 200 can be implemented by a general computer 900 including a central processing unit (CPU) 901, a memory 902, an external storage device 903 such as a hard disk drive (HDD), a reading device 905 that reads information from a portable storage medium 904 such as a compact disk (CD) and a digital versatile disk (DVD), an input device 906 such as a keyboard, a mouse, and a barcode reader, an output device 907 such as a display, and a communication device 908 that communicates with another computer via a communication network such as the Internet. Alternatively, the production progress management device 200 can be implemented by a network system including a plurality of the computers 900. It is needless to say that the reading device 905 may be capable of writing as well as reading the portable storage medium 904.

For example, the control unit 220 can be implemented by loading a predetermined program stored in the external storage device 903 in the memory 902 and executing the program by the CPU 901, the input unit 230 can be implemented by the CPU 901 using the input device 906, the output unit 240 can be implemented by the CPU 901 using the output device 907, the communication unit 250 can be implemented by the CPU 901 using the communication device 908, and the storage unit 210 can be implemented by the CPU 901 using the memory 902 or the external storage device 903.

The predetermined program may be downloaded into the external storage device 903 from the portable storage medium 904 via the reading device 905 or from the network 999 via the communication device 908, and then loaded into the memory 902 and executed by the CPU 901. In addition, the program may be directly loaded into the memory 902 from the portable storage medium 904 via the reading device 905 or from the network via the communication device 908 and executed by the CPU 901.

The work instruction device 100 to be described later can also be implemented by the general computer 900 as shown in FIG. 11.

FIG. 12 is a diagram showing an example of the flow of the product in-progress process estimation processing. The product in-progress process estimation processing is started at a predetermined time (for example, every day) or when an instruction to start the processing is issued to the production progress management device 200.

First, the product in-progress process estimation unit 226 extracts data whose process estimation column 216h has an initial value "0" from data stored in the product signal storage unit 216 (step S2201).

Then, the product in-progress process estimation unit 226 repeats processing of steps S2203 to S2211 to be described later for all extracted data (steps S2202 and S2212).

The product in-progress process estimation unit 226 determines whether a value of the position change column 216d is "0", that is, whether no changes occur in the position of the product for one piece of the extracted data. When the value is "0" (in case of YES, that is, when no position changes occur), the control proceeds to step S2204. When the value is not "0" (in the case of NO, that is, when a position change occurs), the product in-progress process estimation unit 226 proceeds the control to step S2206 (step S2203).

When the value of the position change column 216d is "0" ("YES" in step S2203), the product in-progress process estimation unit 226 extracts a process name and a process ID of data having the latest date and time stored in the product in-progress process storage unit 217 for the product ID indicated by the data (step S2204).

Then, the product in-progress process estimation unit 226 adds the process name and the process ID extracted in step S2204 and date and time information at the time of processing to the data (one piece of the extracted data of the product signal storage unit 216 being processed), and stores the process name, the process ID, and the date and time information as new data in the product in-progress process storage unit 217 (step S2205). Then, the product in-progress process estimation unit 226 proceeds the control to step S2211.

When the value of the position change column 216d is not "0" ("NO" in step S2203), the product in-progress process estimation unit 226 extracts a process name and a process ID of a current in-progress process from data stored in the production progress storage unit 213 for the product ID of the data (step S2206). Since only the in-progress processes are stored in the production progress storage unit 213, only an in-progress process names and process IDs can be acquired.

Then, the product in-progress process estimation unit 226 extracts a process name and a process ID of a next process of the current in-progress process from data stored in the production plan storage unit 212 for the product ID of the data (step S2207).

Then, the product in-progress process estimation unit 226 extracts a process name list of data in which the area and the facility ID of the position and process information storage unit 218 match the area and the facility ID of the data as an in-progress process candidate (step S2208).

Then, the product in-progress process estimation unit 226 searches the extracted in-progress process candidates in an order of a next process name extracted in step 2207 and a current process name extracted in step S2206, and if matching, applies the matching process name and process ID of the process to the data and stores the data in the product in-progress process storage unit 217 (step S2209).

When no matching processes are present in the previous step (step S2209), the product in-progress process estimation unit 226 stores the data in the product in-progress process storage unit 217 with the process name of the data being "moving" and the "process ID" being blank (step S2210).

Then, the product in-progress process estimation unit 226 changes the process estimation column 216*h* of data stored in the product signal storage unit 216 corresponding to the data to "1" (step S2211).

Then, the product in-progress process estimation unit 226 determines whether the processing of steps S2203 to S2211 is completed for all data, and if non-completed data is present, the control is returned to step S2203. When the processing is completed for all the data, the product in-progress process estimation unit 226 ends the product in-progress process estimation processing (step S2212).

The above is the flow of the product in-progress process estimation processing. According to the product in-progress process estimation processing, it is possible to detect a change in the process based on a change in the position of the product and estimate the in-progress process.

FIG. 13 is a diagram showing an example of a flow of the production progress estimation and update processing. The production progress estimation and update processing are started at the timing when the data of which the value of the position change column 217*f* is "1" is stored in the product in-progress process storage unit 217.

First, the production progress estimation and update unit 227 extracts, from the production progress storage unit 213, data (referred to as data B) that matches the product ID of the data (referred to as data A) newly stored in the product in-progress process storage unit 217 (step S2213).

Then, the production progress estimation and update unit 227 determines whether the process name and the process No of the data A match the process name and the process No of the data B (step S2214). When the process name and the process No of the data A match the process name and the process No of the data B ("YES" in step S2214), the production progress estimation and update unit 227 proceeds the control to step S2219 to be described later.

When the process name and the process No of the data A do not match the process name and the process No of the data B ("NO" in step S2214), the production progress estimation and update unit 227 proceeds the control to step S2215.

The production progress estimation and update unit 227 determines whether the value of the state column 213*h* is "started" in the data of the product ID stored in the production progress storage unit 213 (step S2215). When the state is "started" ("YES" in step S2215), the production progress estimation and update unit 227 proceeds the control to the next step S2216, and when the state is not "started" ("NO" in step S2215), the control proceeds to step S2218.

The production progress estimation and update unit 227 adds the data to the production performance storage unit 211 by using the date and time column 217*e* included in the data A as the completion date and time with respect to the data of the product ID stored in the production progress storage unit 213 (step S2216).

Then, with respect to the data of the product ID stored in the production progress storage unit 213, the production progress estimation and update unit 227 updates the process No to the process No of the data A, and inputs the date and time of the data A to the previous process completion date and time column 213*k* (step S2217).

Then, the production progress estimation and update unit 227 executes a production progress estimation processing (step S2218).

When a change occurs in the production performance storage unit 211 and the production progress storage unit 213, the production progress estimation and update unit 227 transmits a change point to the manufacturing execution system 300 and the work instruction device 100 via the communication unit 250 by the MES data update unit 222 (step S2219).

The above is the flow of the production progress estimation and update processing. According to the production progress estimation and update processing, when new data is added to the product in-progress process storage unit 217 and the process thereof is "started", estimation of production progress can be performed.

FIG. 14 is a diagram showing an example of a flow of the production progress estimation processing in the production progress estimation and update processing. The present example corresponds to a case where only the position information of the product is used in the estimation of the production progress.

First, the production progress estimation and update unit 227 determines whether a facility attribute of the product ID specified by the data A corresponds to the "parts storage" (step S2220). Specifically, the production progress estimation and update unit 227 refers to the facility ID column 217*b* having the product ID specified by the data A, and extracts data having the same facility ID from the facility ID column 218*b* of the position and process information storage unit 218. Then, the production progress estimation and update unit 227 refers to the value of the facility attribute column 218*c* of the extracted data to determine whether the data corresponds to "parts storage".

When the facility attribute corresponds to the "parts storage" ("YES" in step S2220), the production progress estimation and update unit 227 changes the value of the state column 213*h* to "waiting" for the data having the product ID stored in the production progress storage unit 213 (step S2221). Then, the production progress estimation and update unit 227 ends the production progress estimation and update processing.

When the facility attribute does not correspond to the "parts storage" ("NO" in step S2220), the production progress estimation and update unit 227 changes the value of the state column 213*h* to "started" for the data having the product ID stored in the production progress storage unit 213, and stores the value of the date and time column 217*e* of the product in-progress process storage unit 217 related to the product ID specified by the data A in the start date and time column 213*i* (step S2222). Then, the production progress estimation and update unit 227 ends the production progress estimation and update processing.

The above is the flow of the production progress estimation processing in the production progress estimation and update processing. According to the production progress estimation processing in the production progress estimation and update processing, when the position of the part or product is changed to the parts storage, progress of the part or product can be changed to "waiting", and when changed to an attribute other than the parts storage, the progress of the part or product can be changed to "started" and the start date and time can be recorded.

FIG. 15 is a diagram showing another example of a flow of the production progress estimation processing. The present example corresponds to a case where not only the position information of the product but also the position information of the worker and facility performance information are used in the estimation of the production progress. In this example, when the position information of the product and information for specifying the position of the worker are in positions of the same process point and the facility in the process operates at the same time, the production progress estimation and update unit 227 performs estimation to determine that the process is working.

First, the production progress estimation and update unit 227 determines whether the facility attribute of the product ID specified by the data A corresponds to the "parts storage" (step S2223). Specifically, the production progress estimation and update unit 227 refers to the facility ID column 217*b* having the product ID specified by the data A, and extracts data having the same facility ID from the facility ID column 218*b* of the position and process information storage unit 218. Then, the production progress estimation and update unit 227 refers to the value of the facility attribute column 218*c* of the extracted data to determine whether the data is "parts storage".

When the facility attribute corresponds to the "parts storage" ("YES" in step S2223), the production progress estimation and update unit 227 changes the value of the state column 213*h* to "waiting" for the data having the product ID stored in the production progress storage unit 213 (step S2224). Then, the production progress estimation and update unit 227 ends the production progress estimation and update processing.

When the facility attribute does not correspond to the "parts storage" ("NO" in step S2223), the production progress estimation and update unit 227 reads the value of the date and time column 217*e* of the product in-progress process storage unit 217 related to the product ID specified by the data A, and acquires the presence or absence information of the worker who operates the manufacturing facility at the read date and time (step S2225).

Specifically, the production progress estimation and update unit 227 attempts to extract, from the worker signal storage unit 214, a worker ID from the worker ID column 214*a* related to the facility specified by the value of the facility ID 217*b* at a date and time specified by the value of the read date and time column 217*e*, acquires the presence or absence information indicating that the worker is not present when the worker ID cannot be extracted, and acquires the presence or absence information indicating that the worker is present when the worker ID can be extracted.

Then, the production progress estimation and update unit 227 reads the value of the date and time column 217*e* of the product in-progress process storage unit 217 related to the product ID specified by the data A, and acquires operating state information of the manufacturing facility at the read date and time (step S2226).

Specifically, the production progress estimation and update unit 227 extracts, from the facility performance storage unit 215, the state column 215*b* related to the facility specified by the value of the facility ID column 217*b* at the date and time specified by the value of the read date and time column 217*e*.

Then, at the date and time specified by a value of the read date and time column 217*e*, the production progress estimation and update unit 227 determines whether the work for the part or the product is started, that is, whether the worker is present and the manufacturing facility operates (step S2227). Specifically, at the date and time specified by the value of the read date and time column 217*e*, the production progress estimation and update unit 227 determines whether the information generated by the worker obtained in step S2225 is "worker present" and the state of the facility obtained in step S2226 is "operating".

When the worker is present and the manufacturing facility operates ("YES" in step S2227), the production progress estimation and update unit 227 changes the value of the state column 213*h* to "started" for the data having the product ID stored in the production progress storage unit 213, and stores the value of the date and time column 217*e* of the product in-progress process storage unit 217 related to the product ID specified by the data A in the start date and time column 213*i* (step S2228). Then, the production progress estimation and update unit 227 ends the production progress estimation and update processing.

When the worker is absent or the manufacturing facility does not operate ("NO" in step S2227), the production progress estimation and update unit 227 changes the value of the state column 213*h* to "waiting" for the data having the product ID stored in the production progress storage unit 213 (step S2229). Then, the production progress estimation and update unit 227 ends the production progress estimation and update processing.

The above is a description of the configuration and operation of the production progress management device 200. According to the production progress management device 200, the production process can be estimated by using the position of the product, the position of the worker, and the operating status of the manufacturing facility. That is, it is possible to accurately grasp progress of a production site.

Next, the configuration and operation of the work instruction device 100 will be described.

FIG. 16 is a diagram showing a configuration example of the work instruction device. The work instruction device 100 includes a storage unit 110, a control unit 120, an input unit 130, an output unit 140, and a communication unit 150.

The storage unit 110 includes a production performance storage unit 111, a production plan storage unit 112, a production progress storage unit 113, a process information storage unit 114, a start rule storage unit 115, and a start rule priority storage unit 116.

The production performance storage unit 111 stores information for specifying work (processing) of a process, a date and time at which the work (processing) is started, the date and time at which the work (processing) is completed, a manufacturing facility that performs the work (processing), and a worker who performs the work (processing) for each product such as apart or a product. The production performance storage unit 111 records the start date and time and end date and time of each process related to the product, and thus can be said as storing the throughput.

An example of a specific data structure of the production performance storage unit 111 is similar as that of the production performance storage unit 211 of the production progress management device 200, and a description thereof is omitted.

The production plan storage unit 112 stores information for specifying work (processing) of a process, a scheduled date and time at which the work (processing) is started, a scheduled date and time at which the work (processing) is completed, a scheduled manufacturing facility that performs the work (processing), and a scheduled worker who performs the work (processing) for each product such as a part or a product.

An example of a specific data structure of the production plan storage unit 112 is similar as that of the production plan storage unit 212 of the production progress management device 200, and a description thereof is omitted.

The production progress storage unit 113 stores information for specifying the progress and the state for each product such as a part or a product.

An example of a specific data structure of the production progress storage unit 113 is similar as that of the production progress storage unit 213 of the production progress management device 200, and a description thereof is omitted.

The process information storage unit 114 stores information on a display process name, a display order thereof, and a process name included in the display process name used at output of the work instruction device 100.

FIG. 17 is a diagram showing an example of a data structure of the process information storage unit. The information stored in the process information storage unit 114 is updated periodically or sporadically as changes occur due to the change of the process design information or the layout change of the factory.

The process information storage unit 114 includes a display pattern No column 114a, a display order No column 114b, a display process name column 114c, a type name column 114d, and a process name column 114e. The display pattern No column 114a, the display order No column 114b, the display process name column 114c, the type name column 114d, and the process name column 114e are associated with each other.

The display pattern No column 114a stores information for specifying a display pattern (layout pattern) used in a screen (for example, a production status display area 500c in an output screen 500 of FIG. 22 to be described later) for displaying process information.

The display order No column 114b stores information on a display order for the display pattern specified in the display pattern No column 114a.

The display process name column 114c stores information for specifying a process name. The type name column 114d stores information for specifying a type name. The process name column 114e stores information for specifying a process name.

The description will be returned to FIG. 16. The start rule storage unit 115 stores a start rule for determining a work order in the process. The start rule is a rule that determines which process is prioritized when there are a plurality of processes that can be started, or a rule that is predetermined by an operator or a rule that is customarily determined in an industry, such as "first in, first out (FIFO)", "priority of delivery time", "in-progress next process", and "order of instruction".

FIG. 18 is a diagram showing an example of a data structure of the start rule storage unit. The start rule storage unit 115 includes a start rule name column 115a, an evaluation index column 115b, and a sort rule column 115c, and the columns are associated with each other.

The start rule name column 115a stores information for specifying a name of the start rule. The evaluation index column 115b stores information for specifying an index value for determining an order in the start rule. The sort rule column 115c stores rules for sorting index values.

The description will be returned to FIG. 16. The start rule priority storage unit 116 stores information on a priority of start rules.

FIG. 19 is a diagram showing an example of a data structure of the start rule priority storage unit. The start rule priority storage unit 116 includes, for each display process name column 116a, an applicable start rule name column 116b, a priority score column 116c, a total number column 116d, and a number of on time column 116e. The priority score column 116c, the total number of cases column 116d, and the number of on times column 116e store information updated by a start rule priority update unit 123 to be described later.

The priority score column 116c stores a score derived from information stored in the total number of cases column 116d and the number of on times column 116e. For example, a value with a total number of cases as a denominator and the number of on times as a numerator (compliance rate) is stored as a priority score.

The description will be returned to FIG. 16. The control unit 120 of the work instruction device 100 includes a data collection unit 121, a recommended work generation unit 122, and the start rule priority update unit 123.

The data collection unit 121 acquires and updates information stored in the production performance storage unit 111, the production plan storage unit 112, and the production progress storage unit 113 from both or one of the production progress management device 200 and the manufacturing execution system 300 at a predetermined time (for example, every day) or at a designated time. For example, the data collection unit 121 acquires and updates the production performance storage unit 211, the production plan storage unit 212, and the production progress storage unit 213 from the production progress management device 200.

When designated, the recommended work generation unit 122 starts a recommended work generation processing to be described later to extract a recommended work in the designated process, and displays and outputs the recommended work through the output unit 140.

When designated, the start rule priority update unit 123 starts a start rule priority update processing to be described later to update an index used for priority evaluation of the start rule, and stores and updates the index in the start rule priority storage unit 116.

FIG. 20 is a diagram showing an example of a flow of the recommended work generation processing. The recommended work generation processing is started when the work instruction device 100 issues an instruction to start processing through the input unit 130 together with designation of a process.

First, for the designated process, the recommended work generation unit 122 refers to the production plan storage unit 112 to acquire product information scheduled to be worked next, and calculates a scheduled arrival date and time to the process (step S1201). Specifically, the recommended work generation unit 122 calculates the scheduled arrival date and time to the process designated for the product to be worked next in the plan using in-progress process information of the product stored in the production progress storage unit 113 and estimated work time (standard work time) until arrival at the process stored in the production plan storage unit 112 (step S1201).

Then, the recommended work generation unit 122 uses the information stored in the production progress storage unit 113 to extract waiting in-progress products in the process (step S1202).

Then, the recommended work generation unit 122 extracts the priority of the start rules of the process from the start rule priority storage unit 116 (step S1203).

The recommended work generation unit 122 applies the start rule with a highest priority in the process, that is, a highest value of the priority score column 116c to rearrange the in-progress products extracted in step S1202, and when a process that cannot be ordered by a single start rule is present, the recommended work generation unit 122 sequentially prioritizes the in-progress products by sequentially using start rules with second and subsequent priorities (step S1204).

The recommended work generation unit 122 extracts work time of each in-progress process and the in-progress process in which the work can be completed before the scheduled arrival date and time calculated in step S1201 in an order from in-progress process with the highest priority (step S1205).

The recommended work generation unit 122 sets the in-progress work thus extracted as the recommended work and outputs the recommended work through the output unit 140 (step S1206). The above is a flow of the recommended work generation processing. According to the recommended work generation processing, the scheduled arrival date and time of the product to arrive can be specified with reference to a processing start date and time, and the recommended work can be specified by applying an implementation rule. For example, when a significant delay occurs in a manufacturing process of a certain product, a person in charge of the downstream process may be forced to make a decision of whether to start manufacturing another product or to wait for arrival, whereas the recommended work generation processing can display and output this, so that the person in charge of the downstream process can start optimal work without hesitation and an influence of delay can be minimized.

FIG. 21 is a diagram showing a flow of the start rule priority update processing. The start rule priority update processing is executed for all the products stored in the production progress storage unit 113 when the state is changed to "started".

First, the start rule priority update unit 123 extracts necessary information from the production progress storage unit 113 for the product for which a manufacturing processing is started (step S1207).

Next, the start rule priority update unit 123 extracts relevant information from the production performance storage unit 111 and the production plan storage unit 112 (step S1208).

Then, the start rule priority update unit 123 extracts all start rules of the process stored in the start rule priority storage unit 116 with respect to the process in which work of a target product is started (step S1209).

Then, the start rule priority update unit 123 determines compliance or non-compliance of the completion date and time of the process for all the extracted rules, and updates the information (the priority score, the total number of cases, and the number of on times) of the start rule priority storage unit 116 (step S1210). Various methods can be adopted for calculating the priority score. For example, a value with the total number of cases as the denominator and the number of on times as the numerator may be used as the priority, or a value obtained by adding a predetermined correction value to the value may be calculated. The value is not limited to this, and may be any value that is derived using a predetermined performance value.

The above is the flow of the start rule priority update processing. According to the start rule priority update processing, the priority score and the like of the start rule can be updated according to the performance.

FIG. 22 shows an example of an output screen of the recommended work generation processing. The output screen 500 is an example of output information of the work instruction device 100. The output screen 500 includes a display process selection area 500*a*, a work instruction display area 500*b*, and the production status display area 500*c*.

When displayed on the output unit 140, a production status of each process is output to the production status display area 500*c*. An arrangement of the processes in the production status display area 500*c* is determined in accordance with the display pattern stored in the process information storage unit 114. For example, the output unit 140 outputs a graph showing which process is performed for each product in a grid pattern.

For example, the recommended work generation unit 122 accesses the production plan storage unit 112 to specify the processes in an order from the closer scheduled start dates and times, and accesses the production performance storage unit 111 to extract an in-progress product indicating the value in the completion date and time column does not elapse. Then, the recommended work generation unit 122 accesses the production progress storage unit 113 and the production plan storage unit 112 to calculate and specify a current process of the in-progress product and arrival time from the process to each process. Then, the output unit 140 lays out the production status along the display pattern so as to output the production status to the production status display area 500*c*. At that time, it is desirable to distinguish between the started products and the waiting products in each process. The output unit 140 lays out a work plan based on the production plan so as to display the work plan in the work instruction display area 500*b*.

In the production status display area 500*c*, the planned value of production throughput of each process and the performance value indicating a degree of arrival thereof may be graphed and shown. Accordingly, when the throughput is sufficiently obtained even when the delay occurs, it is possible to make a determination that there is no need to perform a special work change.

FIG. 23 is a diagram showing another example of the output screen of the recommended work generation processing. An output screen 510 is an example of the output information of the work instruction device 100. The output screen 510 includes a product information display area 510*a* and a schedule display area 510*b*. The output screen 510 is displayed as a separate screen in the work instruction display area 500*b* of the output screen 500 when an input targeting the displayed product is received, for example, when a click input is performed.

In the schedule display area 510*b*, a schedule of implementation processes for a predetermined product whose horizontal axis is a time axis, such as a Gantt chart, is displayed.

FIG. 24 is a diagram showing another example of the output screen of the recommended work generation processing. An output screen 520 is an example of the output information of the work instruction device 100. The output screen 520 includes a display process selection area 520*a*, a work instruction display area 520*b*, and a recommended work display area 520*c*.

In the output screen 520, an input is received in the display process selection area 520*a* via the input unit 130. When the input is received in the display process selection area 520*a*, the output unit 140 displays a work plan based on the production plan on the work instruction display area 520*b* for the input process, and lays out the recommended work specified based on the recommended work generation processing so as to display the recommended work on the recommended work display area 520*c*.

The above is a configuration example of the work instruction system according to the first embodiment of the invention. According to the first embodiment, it is possible to accurately perform an appropriate work instruction in accordance with the progress of the production site.

The embodiment described above has been described in detail for easy understanding of the invention, and the invention is not necessarily limited to include all configurations described above. Apart of a configuration of one embodiment can be replaced with a configuration of another embodiment, and the configuration of another embodiment can also be added to the configuration of one embodiment. A part of the configuration of the embodiment may be deleted.

Units, configurations, functions, processing units, and the like described above may be partially or entirely implemented by hardware such as through design using an integrated circuit. The units, configurations, functions, and the like described above may be implemented by software by a processor interpreting and executing a program for implementing respective functions. Information such as a program, a table, and a file for implementing each function can be placed in a memory, a recording device such as a hard disk, or a recording medium such as an IC card, an SD card, or a DVD.

Control lines and information lines according to the embodiment described above indicate what is considered necessary for the description, and not all of the control lines and the information lines are necessarily shown in a product. Actually, it may also be considered that almost all of the configurations are connected to each other. As described above, the invention has been described centering on the embodiment.

REFERENCE SIGN LIST

10: work instruction system
100: work instruction device
110: storage unit
111: production performance storage unit
112: production plan storage unit
113: production progress storage unit
114: process information storage unit
115: start rule storage unit
116: start rule priority storage unit
120: control unit
121: data collection unit
122: recommended work generation unit
123: start rule priority update unit
130: input unit
140: output unit
150: communication unit
200: production progress management device
210: storage unit
211: production performance storage unit
212: production plan storage unit
213: production progress storage unit
214: worker signal storage unit
215: facility performance storage unit
216: product signal storage unit
217: product in-progress process storage unit
218: position and process information storage unit
220: control unit
221: MES data collection unit
222: MES data update unit
223: worker signal collection unit
224: facility performance collection unit
225: product signal collection unit
226: product in-progress process estimation unit
227: production progress estimation and update unit
230: input unit
240: output unit
250: communication unit
300: manufacturing execution system
999: network

The invention claimed is:

1. A work instruction system comprising:
a manufacturing execution system that manages manufacturing of a product;
a production progress management device coupled to the manufacturing system via a network; and
a work instruction device coupled to the manufacturing system via the network,
wherein the production progress management device includes a first memory coupled to a first processor, the first memory storing instructions that when executed by the first processor, configures the first processor to execute:
 a communication unit configured to communicate with the work instruction device,
 a product signal storage unit configured to store a product signal including position information of the product,
 a product in-progress process estimation unit configured to estimate an in-progress process, among a plurality of processes, of the product using the position information of the product, and
 a production progress estimation and update unit configured to estimate production progress of the product in accordance with a change in the position information of the product and update production progress information obtained from the manufacturing execution system, and
wherein the work instruction device includes a second memory coupled to a second processor, the second memory storing instructions that when executed by the second processor, configures the second processor to execute:
 a communication unit configured to communicate with the production progress management device,
 a production progress storage unit configured to store the production progress information,
 a data collection unit configured to obtain the production progress information updated from the production progress management device via the communication unit,
 a start rule priority storage unit storing a plurality of records, each record includes a name of a respective process, a name of a respective start rule associated with the respective process, a priority score of the associated respective start rule, a first value indicating a number of times the process associated with the start rule has been used and a second value indicating a number of times the process associated with the start rule has completed on time, the priority score being calculated based on the first value and the second value,
 a recommended work generation unit configured to generate recommended work information by using the updated production progress information for a predetermined product, the recommended work information generated by extracting products that are waiting, extracting a priority of start rules of each respective process, each start rule indicating which process is prioritized among the processes, and automatically applies the start rule having a highest priority based on the priority score to the extracted products that are waiting to rearrange an order of the products that are waiting, an output unit configured to display, simultaneously:
- a guided-user-interface to receive a selection of a process in a first screen area, a work instruction based on a production plan of the product by displaying at least two of the processes in chronological order in a second screen area, and a third screen area displaying, in a predetermined grid pattern having at least two processes in a column direction and at least two different states in a row direction, product identifications in respective positions in the predetermined grid pattern indicating a current process of the product and a current state of the product, and displaying a current throughput indicating a number of completions of each of the at least two processes, wherein the current throughput and the positions of the product identifications in the predetermined grid pattern are automatically changed based on automatic updates of the current process of the product and the current state of the product that is automatically obtained from the manufacturing execution system, and
- a start rule priority update unit configured to automatically calculate and update the priority score of the start rules based on updates to at least one of the first value and the second value, wherein the product is manufactured according to the manufacturing execution system and based on the work instruction and the generated recommended work information.

2. The work instruction system according to claim 1, wherein the first processor of production progress management device is configured to execute:
- a worker signal storage unit including information for specifying a position of a worker in time series, and
- a facility performance storage unit including information for specifying an operating status of a facility for manufacturing the product in time series, and wherein the production progress estimation and update unit is configured to:
- determine that the process is started when the position information of the product and the information for specifying the position of the worker are in positions of the same process and the facility in the process operates at the same time point.

3. The work instruction system according to claim 1, wherein the production progress estimation and update unit is configured to estimate that the production progress of the product does not change when the position information of the product does not change, and estimate that a process at a changed position is started when the position information changes.

4. The work instruction system according to claim 1, wherein the production progress estimation and update unit is configured to estimate that the production progress of the product does not change when the position information of the product does not change, and estimate that a process at a changed position is started when the position information changes and the changed position is not a predetermined parts storage.

5. The work instruction system according to claim 1, wherein the production progress estimation and update unit is configured to estimate that the production progress of the product does not change when the position information of the product does not change, estimate that a process of the product is waited when the position information changes and the changed position is a predetermined parts storage, and estimate that a process at a changed position is started when the position information changes and the changed position is not a predetermined parts storage.

6. The work instruction system according to claim 1, wherein the second processor of the work instruction device is configured to execute:
a start rule priority update unit configured to:
calculate and update a priority of start rules to be used when generating the recommended work information from an in-progress work such that a work having a higher compliance rate has a higher priority, and
automatically update the start rules for each process.

7. The work instruction system according to claim 1, wherein the at least two different states of the predetermined grid pattern are started indicating a respective process for a product has started and waiting indicating a product is waiting to start a respective process.

8. A work instruction method using a manufacturing execution system that manages manufacturing of a product, a production progress management device coupled to the manufacturing system via a network and a work instruction device coupled to the manufacturing system via a network, wherein the production progress management device includes a processor, a communication unit that communicates with the work instruction device, and a product signal storage unit that stores a product signal including position information of the product, and wherein the work instruction device includes a processor, a communication unit that communicates with the production progress management device, and a production progress storage unit that stores the production progress information, the method comprising:
steps expected by the production progress management device including:
- a product in-progress process estimation processing of estimating an in-progress process of the product using the position information of the product; and
- a production progress estimation and update processing of estimating production progress of the product in accordance with a change in the position information of the product and updating production progress information obtained from the manufacturing execution system;
steps executed by the work instruction device including:
- a data collection processing of obtaining the production progress information updated from the production progress management device via the communication unit;
- a start rule priority storage unit storing a plurality of records, each record includes a name of a respective process, a name of a respective start rule associated with the respective process, a priority score of the associated respective start rule, a first value indicating a number of times the process associated with the start rule has been used and a second value indicating a number of times the process associated with the start rule has completed on time, the priority score being calculated based on the first value and the second value,
- a recommended work generation processing of generating recommended work information by using the updated production progress information for a predetermined product, the recommended work information generated by extracting products that are waiting, extracting a priority of start rules of each respective process, each start rule indicating which process is prioritized among the processes, and applies the start rule having a highest priority to the extracted products that are waiting to rearrange an order of the products that are waiting;

an output processing of displaying, simultaneously:

a guided-user-interface to receive a selection of a process in a first screen area, a work instruction based on a production plan of the product by displaying at least two of the processes in chronological order in a second screen area, and a third screen area displaying, in a predetermined grid pattern having at least two processes in a column direction and at least two different states in a row direction, product identifications in respective positions in the predetermined grid pattern indicating a current process of the product and a current state of the product, and displaying a current throughput indicating a number of completions of each of the at least two processes, wherein the current throughput and the positions of the product identifications in the predetermined grid pattern are automatically changed based on automatic updates of the current process of the product and the current state of the product that is automatically obtained from the manufacturing execution system; and a start rule priority update processing of automatically calculating and updating the respective priority scores of the start rules based on updates to at least one of the first value and the second value; and manufacturing the product according to the manufacturing execution system and based on the work instruction and the generated recommended work information.

\* \* \* \* \*